United States Patent
Hoyer et al.

(10) Patent No.: US 10,440,014 B1
(45) Date of Patent: Oct. 8, 2019

(54) PORTABLE SECURE ACCESS MODULE

(71) Applicant: Assa Abloy AB, Stockholm (SE)

(72) Inventors: Philip Hoyer, Richmond (GB); Uwe Schnabel, Erfurt (DE)

(73) Assignee: ASSA ABLOY AB, Stockholm (SE)

(*) Notice: Subject to any disclaimer, the term of this patent is extended or adjusted under 35 U.S.C. 154(b) by 181 days.

(21) Appl. No.: 15/718,746

(22) Filed: Sep. 28, 2017

Related U.S. Application Data

(60) Provisional application No. 62/437,727, filed on Dec. 22, 2016, provisional application No. 62/414,340, filed on Oct. 28, 2016, provisional application No. 62/401,969, filed on Sep. 30, 2016, provisional application No. 62/402,285, filed on Sep. 30, 2016.

(51) Int. Cl.
*H04L 29/06* (2006.01)

(52) U.S. Cl.
CPC ...... *H04L 63/0853* (2013.01); *H04L 63/0492* (2013.01); *H04L 63/0823* (2013.01)

(58) Field of Classification Search
CPC .......... H04L 63/0853; H04L 63/0823; H04L 63/0492
See application file for complete search history.

(56) References Cited

U.S. PATENT DOCUMENTS

| | | | | |
|---|---|---|---|---|
| 8,893,293 | B1* | 11/2014 | Schmoyer | H04L 63/0807 726/26 |
| 2012/0331527 | A1* | 12/2012 | Walters | G06F 21/6218 726/4 |
| 2013/0073460 | A1* | 3/2013 | Paquin | G06Q 40/02 705/44 |
| 2014/0279611 | A1* | 9/2014 | Evans | G06Q 30/018 705/317 |
| 2014/0351589 | A1* | 11/2014 | Chenna | H04L 63/0823 713/168 |
| 2015/0025874 | A1* | 1/2015 | Matute | H04L 63/0853 704/4 |
| 2015/0381624 | A1* | 12/2015 | Reiter | H04L 63/0428 713/168 |
| 2016/0241403 | A1* | 8/2016 | Lindemann | H04L 63/0861 |
| 2016/0358172 | A1* | 12/2016 | Ziat | G06Q 20/409 |
| 2016/0380774 | A1* | 12/2016 | Lovelock | H04L 9/3247 713/169 |
| 2017/0324750 | A1* | 11/2017 | Khan | H04L 63/123 |
| 2018/0197263 | A1* | 7/2018 | Pearson | G06Q 10/00 |
| 2018/0324151 | A1* | 11/2018 | Talmor | G06Q 20/32 |

* cited by examiner

*Primary Examiner* — Matthew Smithers
(74) *Attorney, Agent, or Firm* — Schwegman Lundberg & Woessner, P.A.

(57) ABSTRACT

Examining virtualized credentials of a holder includes verifying authenticity of a device of a relying party using a verifying device secret that is provided in a portable secure access module device that is separate from and communicates with the relying party device, authorizing a subset of credential data to be sent to the relying party device in response to the device of the relying party being authentic, where the subset of credential data depends on at least one of: a role of the relying party, selection by the holder, and contextual data of the relying party, and communicating with the device of the relying party to display at least some of the subset of credential data on a screen of the device of the relying party. The contextual data may be a privacy level setting, distance between the relying party and the holder, or geolocation of the relying party.

20 Claims, 16 Drawing Sheets

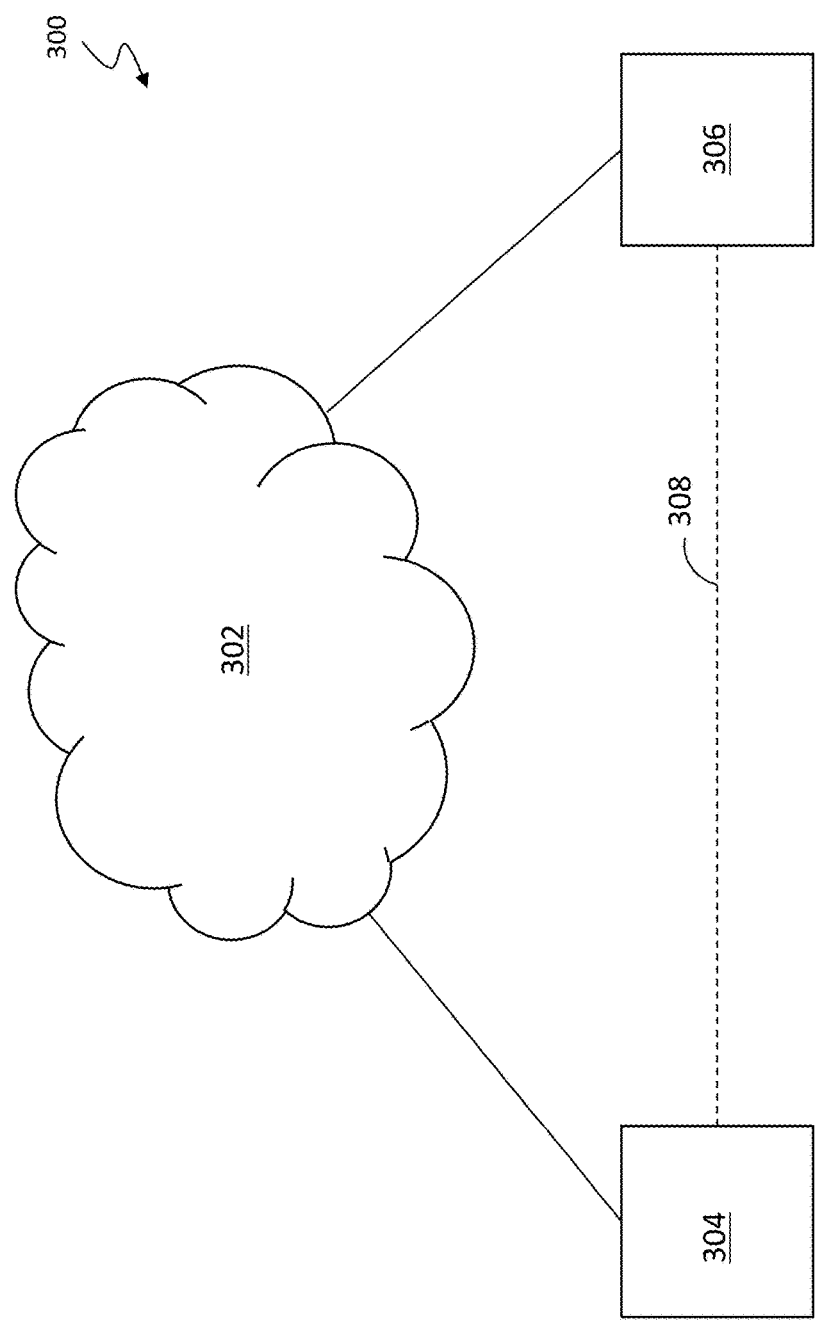

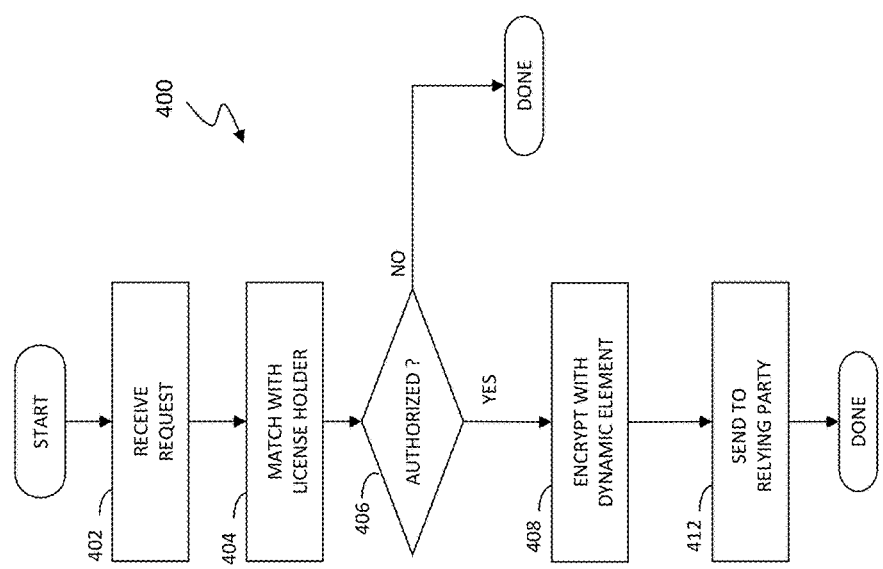

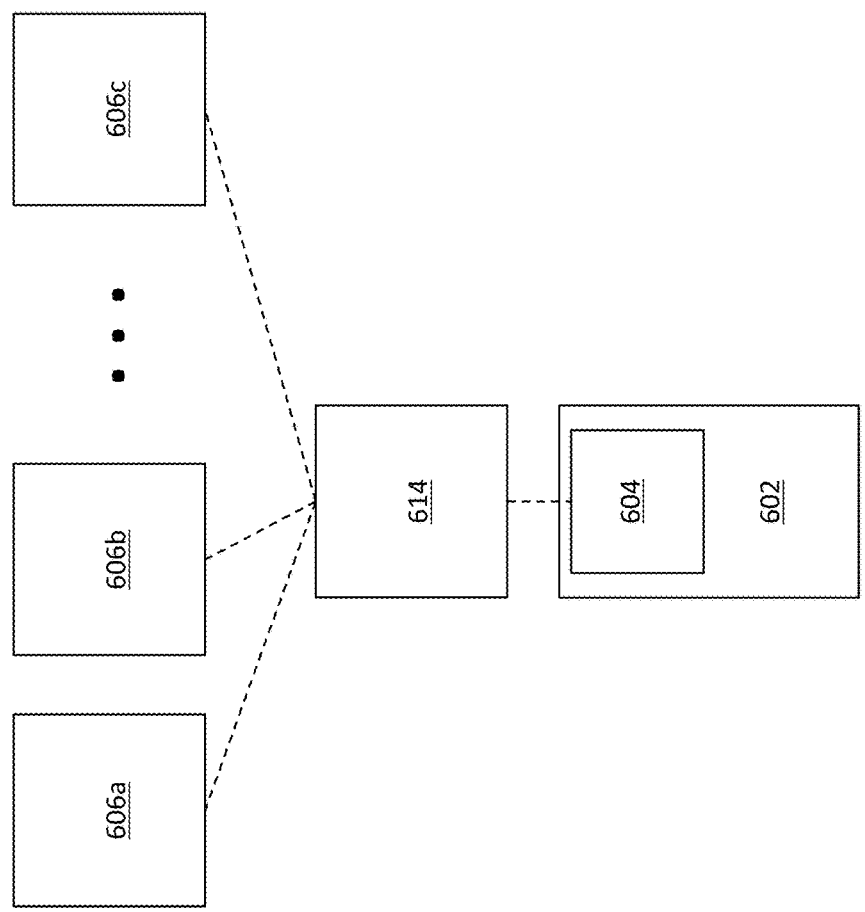

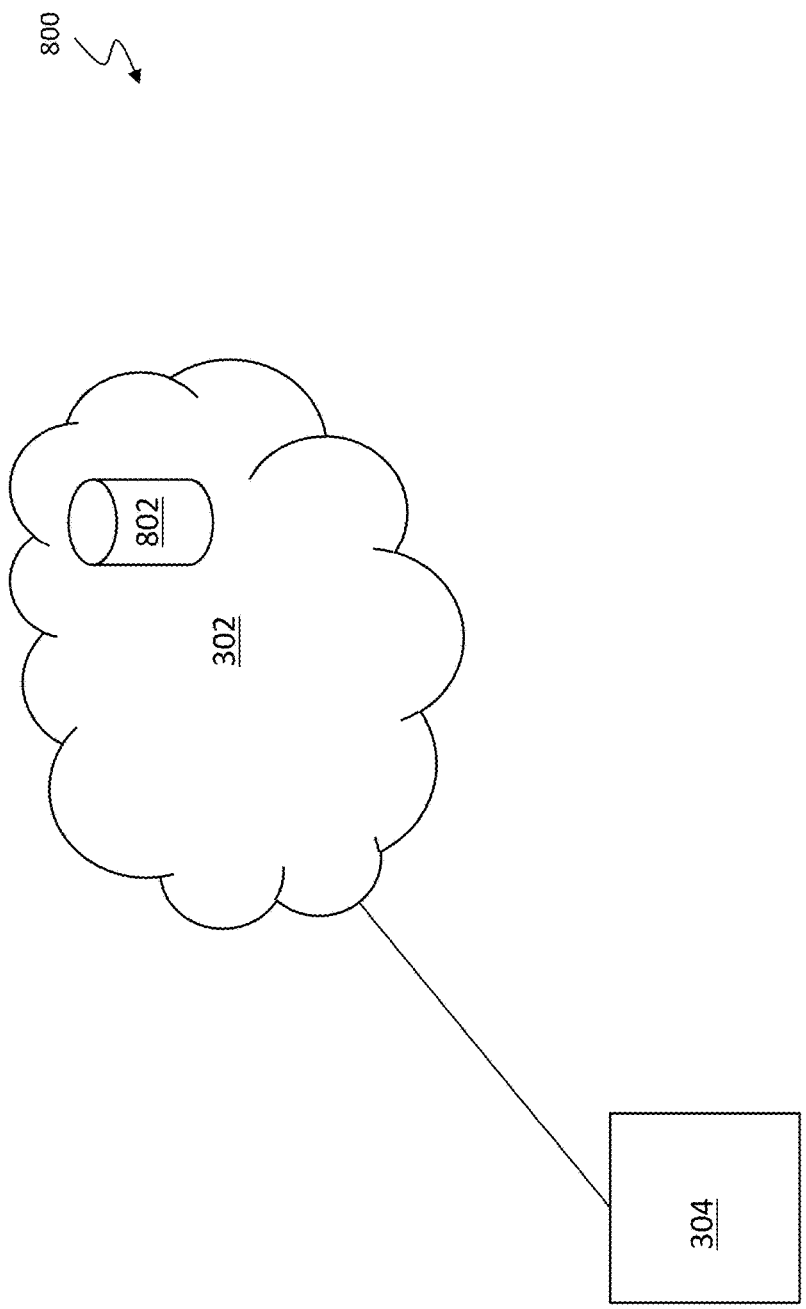

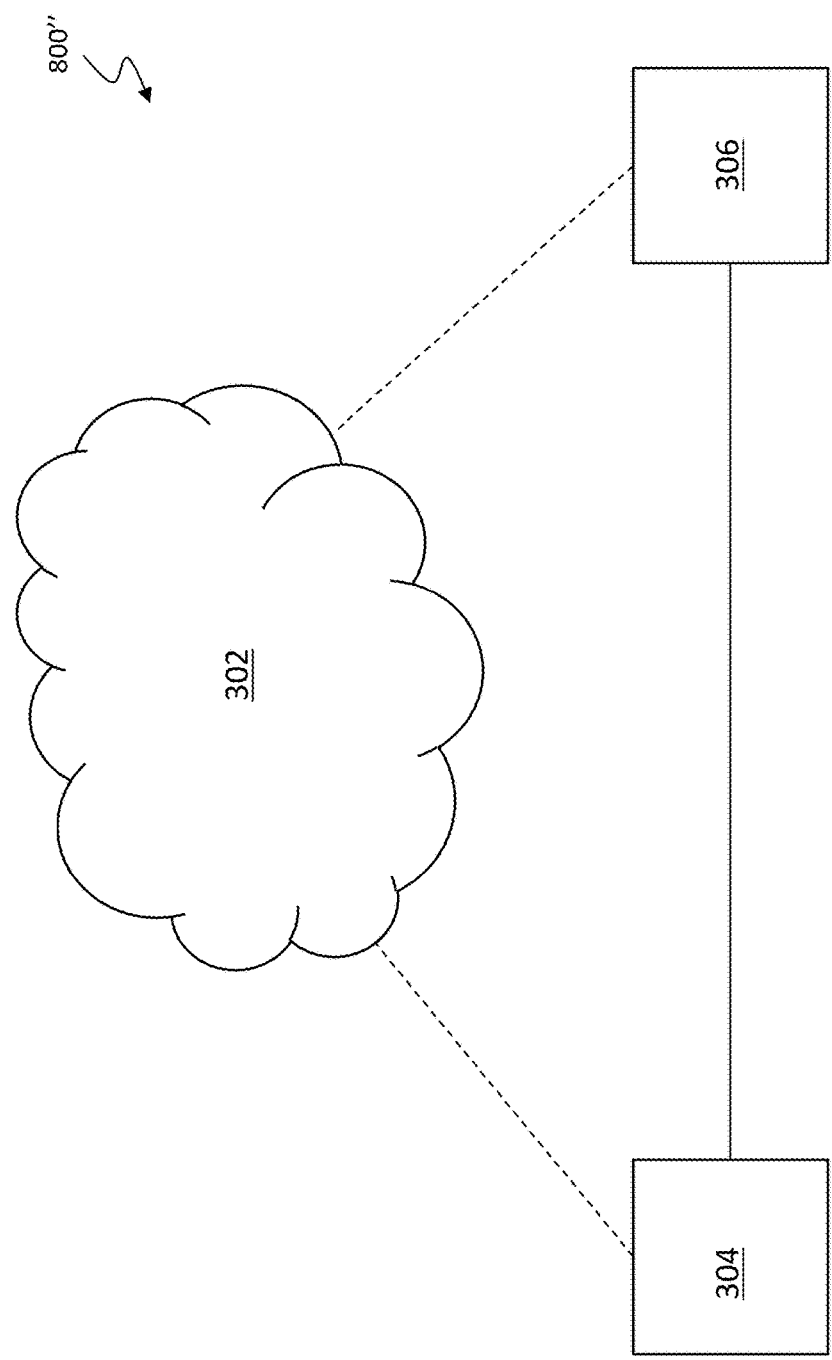

PORTABLE SECURE ACCESS MODULE

CROSS-REFERENCE TO RELATED APPLICATIONS

This application claims priority to U.S. Prov. App. No. 62/437,727, filed Dec. 22, 2016, entitled "MOBILE CREDENTIAL WITH ONLINE/OFFLINE HANDSHAKE" and on U.S. Prov. App. No. 62/414,340, filed Oct. 28, 2016, entitled "VIRTUAL CREDENTIALS AND LICENSES" and on U.S. Prov. App. No. 62/401,969, filed Sep. 30, 2016, entitled "PORTABLE SECURE ACCESS MODULES" and on U.S. Prov. App. No. 62/402,285, filed Sep. 30, 2016, entitled "EXTENDING ELECTRONIC ID INFORMATION", all of which are incorporated by reference herein.

TECHNICAL FIELD

This application relates to the field of credentials and licenses and more particularly to the field of providing virtualized mobile credentials and licenses.

BACKGROUND OF THE INVENTION

Governments and businesses are increasingly interested in issuing virtual ID cards to citizens, customers and employees. The virtual ID cards may be provided on mobile phones, or other similar personal computing device, and displayed using an app running on the device. In some cases, what verifying authorities need to know is not just the identity of the person before them, but instead, other information about the person such as the age of the person or the state of the licenses associated with that person (e.g., revoked, active, etc.). For example, a license holder may present their driver's license to service provider to prove the age of the license holder in connection with purchasing liquor even though the purchase of liquor is unrelated to the issuance by a state of the driver's license. Generally, a state issued driver's license is considered proof of identity and/or age in a number of situations unrelated to driving an automobile. The same may be true, perhaps to a lesser extent, to other types of licenses/credentials issued by government or other authorities.

A relying party that is verifying credentials of a license holder may use a relying party device to read/confirm information provided by a license holder device of the license holder. However, it is desirable that the license holder not release information to an unauthorized relying party or to a malicious actor fraudulently posing as a relying party. This may be addressed by having the relying party use a verifying device secret (VDS) to identify and authenticate the relying party device. For example, the VDS could be a private key of a public/private key pair where the public key for the particular relying party is provided in a PKI digital certificate. In such a case, the license holder could evaluate digitally signed data from the relying party device to confirm authenticity of the relying party. Note that there are many mutual authentication protocols, such as Seos, Seos AKE, OPACITY, PACE, EVM, etc., that could use a VDS of the relying party. Note also that, it some instances, it may also be advantageous for the license holder to use his or her own device secret to verify authenticity. Of course, it is not necessary for the license holder to use the same device secret mechanism as the relying party.

In the case of a relying party using a dedicated device, it is possible to implement some form of secure key storage to protect the VDS from being extracted by an attacker, copied etc. Secure key storage could use secure elements (SEs), Trusted Execution Environments (TEES), etc., which may be generally referred to as Secure Access Modules (SAMs). However, in instances where it is desirable to use a programmed off-the-shelf device for the relying party device, such as a smartphone, it may be more difficult to provide SAM functionality for the relying party device. Some smartphone models provide only limited or costly access to their secure element, such as a UICC (SIM) or an embedded secure element. In some cases, managing the VDS on such devices requires costly integration with trusted service managers or contracts being setup to buy space on such secure elements from an SE issuer, such as a mobile network operator in the case of a SIM or a smartphone manufacturer in the case of the embedded secure element. Another possibility is the use of the TEE technology, which may be easier to manage, but is only present on certain smartphone models (e.g., Android) and may not provide the same level of protection as an SE and does not provide certifiable (Common Criteria or FISP) protection. Similarly, in off-the-shelf smartphones having slots, an SE such as a secure microSD may be used, but many smartphone models do not have slots.

Accordingly, it is Desirable to Provide VDS Functionality in Instances where an Off-the-Shelf Smartphone is Used as a Verifying Device.

SUMMARY OF THE INVENTION

According to the system described herein, examining virtualized credentials of a holder includes verifying authenticity of a device of a relying party using a verifying device secret (VDS) that is provided in a portable secure access module device that is separate from and communicates with the relying party device, authorizing a subset of credential data to be sent to the device of the relying party in response to the device of the relying party being authentic, where the subset of credential data depends on at least one of: a role of the relying party, selection by the holder, and contextual data of the relying party, and communicating with the device of the relying party to display at least some of the subset of credential data on a screen of the device of the relying party. The contextual data may be a privacy level setting, distance between the relying party and the holder, and/or geolocation of the relying party. The role of the relying party may be provided by the relying party. Examining virtualized credentials of a holder may also include the relying party presenting the subset of credential data to a verification service. The subset of credential data sent to the verification service may include a cryptogram generated as a function of cryptographic information associated with a device of the holder. The cryptographic information may include a cryptographic key stored on the device of the holder. The cryptogram may include a variable component corresponding to time, a counter and/or a randomly generated nonce. The holder may provide a URL of the verification service to the relying party. The verification service may redirect the relying party to another server. The relying party may communicate with an intermediary service that directs the relying party to a particular one of a number of possible verification services. An issuing authority that issues the virtualized credentials may filter information about the holder that is released to the relying party. The information may be filtered according to filtering rules stored by one of: the issuing authority or the holder. The secure access module device may be a fob or a smart card. Examining virtualized credentials of a holder may also include ending communication by the device of the relying party in response to the secure access module device not being proximate to the device of the relying party. Proximity may be determined according to whether there is communication between the relying party and the secure access module device.

According further to the system described herein, a non-transitory computer-readable medium contains software that examines virtualized credentials of a holder. The software includes executable code that verifies authenticity of a device of a relying party using a verifying device secret (VDS) that is provided in a portable secure access module device that is separate from and communicates with the relying party device, executable code that authorizes a subset of credential data to be sent to the device of the relying party in response to the device of the relying party being authentic, where the subset of credential data depends on at least one of: a role of the relying party, selection by the holder, and contextual data of the relying party, and executable code that communicates with the device of the relying party to display at least some of the subset of credential data on a screen of the device of the relying party. The contextual data may be a privacy level setting, distance between the relying party and the holder, and/or geolocation of the relying party. The role of the relying party may be provided by the relying party. The relying party may present the subset of credential data to a verification service. The subset of credential data sent to the verification service may include a cryptogram generated as a function of cryptographic information associated with a device of the holder. The cryptographic information may include a cryptographic key stored on the device of the holder. The cryptogram may include a variable component corresponding to time, a counter and/or a randomly generated nonce. The holder may provide a URL of the verification service to the relying party. The verification service may redirect the relying party to another server. The relying party may communicate with an intermediary service that directs the relying party to a particular one of a number of possible verification services. An issuing authority that issues the virtualized credentials may filter information about the holder that is released to the relying party. The information may be filtered according to filtering rules stored by one of: the issuing authority or the holder. The secure access module device may be a fob or a smart card. The software may also include executable code that ends communication by the device of the relying party in response to the secure access module device not being proximate to the device of the relying party. Proximity may be determined according to whether there is communication between the relying party and the secure access module device.

According further to the system described herein, providing virtualized credentials of a holder includes authorizing a subset of credential data to be sent to a device of a relying party that is different from the holder, where the subset of credential data depends on a role of the relying party, selection by the holder, and/or contextual data of the relying party and includes displaying at least some of the subset of credential data on a screen of the device of the relying party. The contextual data may be a privacy level setting, distance between the relying party and the holder, and/or geolocation of the relying party. The role of the relying party may be provided by the relying party. Role information provided by the relying party may be provided in a verifiable format. The role information may be digitally signed or securely derived and determined by a mutual authentication algorithm between the relying party and the holder. Providing virtualized credentials of a holder may also include the relying party presenting the subset of credential data to a verification service. The subset of credential data sent to the verification service may include a cryptogram generated as a function of cryptographic information associated with a device of the holder. The cryptographic information may include a cryptographic key stored on the device of the holder. The cryptogram may include a variable component corresponding to at least one of: time, a counter or a randomly generated nonce. The holder may provide a URL of the verification service to the relying party. The URL may be digitally signed. The verification service may redirect the relying party to another server. The relying party may communicate with an intermediary service that directs the relying party to a particular one of a number of possible verification services. An issuing authority that issues the virtualized credentials may filter information about the holder that is released to the relying party. The information may be filtered according to filtering rules stored by one of: the issuing authority or the holder.

According further to the system described herein, a non-transitory computer-readable medium contains software that provides virtualized credentials of a holder. The software includes executable code that authorizes a subset of credential data to be sent to a device of a relying party that is different from the holder, where the subset of credential data depends on a role of the relying party, selection by the holder, and/or contextual data of the relying party and includes executable code that causes at least some of the subset of credential data to be displayed on a screen of the device of the relying party. The contextual data may be a privacy level setting, distance between the relying party and the holder, and/or geolocation of the relying party. The role of the relying party may be provided by the relying party. Role information provided by the relying party may be provided in a verifiable format. The role information may be digitally signed or securely derived and determined by a mutual authentication algorithm between the relying party and the holder. The software may also include executable code that causes the relying party to present the subset of credential data to a verification service. The subset of credential data sent to the verification service may include a cryptogram generated as a function of cryptographic information associated with a device of the holder. The cryptographic information may include a cryptographic key stored on the device of the holder. The cryptogram may include a variable component corresponding to at least one of: time, a counter or a randomly generated nonce. The holder may provide a URL of the verification service to the relying party. The URL may be digitally signed. The verification service may redirect the relying party to another server. The relying party may communicate with an intermediary service that directs the relying party to a particular one of a number of possible verification services. An issuing authority that issues the virtualized credentials may filter information about the holder that is released to the relying party. The information may be filtered according to filtering rules stored by one of: the issuing authority or the holder.

According further to the system described herein, a system for providing a virtualized credential of a virtualized credential holder to a relying party includes a first device and a device of the relying party that is different from the first device. The first device is configured to authorize a subset of credential data to be sent to the device of the relying party, where the first device is configured to determine the subset of credential data to be sent based on a role of the relying party, selection by the holder, and/or contextual data of the relying party. The device of a relying party is configured to display at least some of the subset of credential data on a screen of the device of the relying party.

According further to the system described herein, providing virtualized credentials of a holder includes authorizing a subset of credential data to be sent to a device of a relying party that is different from the holder, where the subset of credential data depends on a role of the relying party and/or contextual data of the relying party and includes displaying the subset of credential data on a screen of the device of the relying party. The credential data may correspond to a license of the holder. The license may be a driver's license. The credential data may include insurance information of the holder. The contextual data may be geolocation of the relying party. The device of the relying party may be a laptop, a cellphone, or a tablet. The credential data may be provided by a device of the holder. The device of the holder may communicate directly with the device of the relying party. The credential data may be stored in a cloud and the subset of credential data may be sent from the cloud to the device of the relying party. The relying party may receive a release from the holder (possibly in the form of an access token) that allows the relying party to view the subset of credential data and/or access credential data from the cloud or some other source. An issuing authority that issues the virtualized credentials may filter information about the holder that is released to the relying party. The information may be filtered according to filtering rules stored by the issuing authority or the holder.

According further to the system described herein, a non-transitory computer-readable medium contains software that provides virtualized credentials of a holder. The software includes executable code that authorizes a subset of credential data to be sent to a device of a relying party that is different from the holder, where the subset of credential data depends on a role of the relying party and/or contextual data of the relying party and includes executable code that causes the subset of credential data to be displayed on a screen of the device of the relying party. The credential data may correspond to a license of the holder. The license may be a driver's license. The credential data may include insurance information of the holder. The contextual data may be geolocation of the relying party. The device of the relying party may be a laptop, a cellphone, or a tablet. The credential data may be provided by a device of the holder. The device of the holder may communicate directly with the device of the relying party. The credential data may be stored in a cloud and the subset of credential data may be sent from the cloud to the device of the relying party. The relying party may receive a release from the holder (possibly in the form of an access token) that allows the relying party to view the subset of credential data and/or access credential data from the cloud or some other source. An issuing authority that issues the virtualized credentials may filter information about the holder that is released to the relying party. The information may be filtered according to filtering rules stored by the issuing authority or the holder.

According further to the system described herein, providing virtualized credentials of a holder includes authorizing a subset of credential data to be sent to a device of a relying party that is different from the holder, where the subset of credential data depends on a role of the relying party, selection by the holder, and/or contextual data of the relying party and includes displaying the subset of credential data on a screen of the device of the relying party. The contextual data may be a privacy level setting and/or a geolocation of the relying party. The role of the relying party may be provided by the relying party. Role information provided by the relying party may be provided in a verifiable format, such as being digitally signed. Providing virtualized credentials of a holder may also include the relying party presenting the subset of credential data to a verification service. The holder may provide a URL of the verification service to the relying party. The URL may be digitally signed. The verification service may redirect the relying party to another server. The relying party may communicate with an intermediary service that directs the relying party to a particular one of a number of possible verification services.

According further to the system described herein, a non-transitory computer-readable medium contains software that provides virtualized credentials of a holder. The software includes executable code that authorizes a subset of credential data to be sent to a device of a relying party that is different from the holder, where the subset of credential data depends on a role of the relying party, selection by the holder, and/or contextual data of the relying party and includes executable code that causes the subset of credential data to be displayed on a screen of the device of the relying party. The contextual data may be a privacy level setting and/or a geolocation of the relying party. The role of the relying party may be provided by the relying party. Role information provided by the relying party may be provided in a verifiable format, such as being digitally signed. The software may also include executable code that causes the relying party to present the subset of credential data to a verification service. The holder may provide a URL of the verification service to the relying party. The URL may be digitally signed. The verification service may redirect the relying party to another server. The relying party may communicate with an intermediary service that directs the relying party to a particular one of a number of possible verification services.

The system described herein provides a mechanism by which a specific credential, such as a driver's license either on a physical card or a mobile phone, might release different information depending if a validation device asking for the data held on the credential is online or offline, thus speeding up a verification process and augmenting privacy by only releasing a minimum amount of information needed in the specific verification transaction.

The system described herein provides a secure method by which a verifying device can indicate to a credential the verifying device is trying to verify if the verifying device has such online capability and hence allows the secure online retrieval of the credential data instead of from the credential itself may dramatically improve the verification user experience. The same credential can also be verified by an offline verification device. The credential hence can selectively release data depending on the online/offline capability of the verification device.

User identity information could be anything that has a user's name and address, such as a QR code (QC code), image with watermark, etc. that is tied to a license, such as a driver's license, but also other types of licenses, such as a contracting licenses. The licensing information may be tied to insurance associated with that license. The licensing information may be displayed (read via wireless communication or by taking a photo of the information) from a cell phone of the holder, and delivered to a cell phone (ipad, etc.) of a receiver. The identity of the holder could optionally come from a web page where a service provided by the holder is requested (possibly a service of the license issuer), or from an email from the holder or from a proxy (for example confirming an appointment for requested service) to allow the receiver to preview credentials of the provider.

The system described herein may use the cloud to translate identity of a user with an associated license. An id may include a virtual identity from a licensing board that also indicates where to retrieve an actual license, and any required access method information. Input of the user optionally includes a release from the providing party (possibly in the form of an access token) to allow the relying party to read the license/insurance data and/or access the license/insurance data from the cloud or possibly some other source. The id and associated data may include an encrypted dynamic element to prevent a replay attack.

The relying party (possibly a police officer, or service provider such as a rental car agent) may receive on their cell phone (or a local display) a copy of the (drivers/auto) license, and any associated insurance and other data used by the receiver to validate the license holder, such as a biometric reference template. The received data is converted into graphical image(s) of the license which are displayed to a relying party. The graphical image(s) might be abbreviated in the case of poor communication lines or a small display. The format or content of an output may vary based on a wide range of conditions including the device type of the receiver, the role of the receiver and contextual data about the receiver such as geolocation. Optionally, the receiver may present their mobile device (i.e cell phone) for the license holder to present biometric input for validation, such as a fingerprint, iris scan, facial recognition, etc.

The system described herein provides for retrieval and verification of a virtualized license (or licenses) that are mastered within a central repository and which can be displayed on a smart device such as mobile phone. The identity of a user whose license is to be verified may be presented by the user on a mobile device of the user to a device (e.g., phone) of a relying party. The phone of the relying party may capture identity of the user using a camera on the phone of the relying party.

BRIEF DESCRIPTION OF THE DRAWINGS

Embodiments of the system described herein are explained with reference to the several figures of the drawings, which are briefly described as follows.

FIG. 3 is a schematic illustration showing a license holder device, a relying party device and a communications/cloud infrastructure according to an embodiment of the system described herein.

FIG. 4 is a flow diagram illustrating processing performed by a communications/cloud infrastructure according to an embodiment of the system described herein.

FIGS. 6A and 6B are schematic illustrations showing a verifying device containing a verification app that communicates with one or more verification services according to embodiments of the system described herein.

FIGS. 8A and 8B are schematic illustrations showing a license holder device a communications/cloud infrastructure and possibly a relying party device according to alternative embodiments of the system described herein.

FIG. 10 is a schematic illustration showing a license holder device a communications/cloud infrastructure and a relying party device in intermittent communication according to an embodiment of the system described herein

DETAILED DESCRIPTION OF VARIOUS EMBODIMENTS

The system described herein provides a mechanism for selectively providing license and/or credential information electronically in a way that can be verified by a relying party, which is a party that receives the information for possible verification, identification, etc.

Figure 1:
FIG. 1 is a schematic illustration showing a screen with driver's license information thereon according to an embodiment of the system described herein.

Referring to FIG. 1, a screen 100 is provided on a device, such as a smartphone, a tablet, etc. The screen 100 provides driver's license information, including date of birth, expiration, name, address, driver's license number, and a photograph of the owner of the driver's license. The driver's license information may include information that is found in standards such as the American Association of Mother Vehicle Administrators DL/ID Card Design Standard published in August 2013 and available from http://www.aamva.org/DL-ID-Card-Design-Standard/. Any appropriate information/data may be provided as driver's license information, including a QR code (QC code), an image with watermark, etc. that is tied to the driver's license. In some cases, automobile insurance information may be associated with the driver's license. The driver's license holder may input some or all of the information and/or another entity/party (e.g. state registry of motor vehicles) may enter some or all of the information. Note also that, although the system described herein is illustrated in connection with a driver's license, other types of licenses may be used instead and, in fact, other types or credentials/documents/authorizations may be used, such as a county hunting license, a city contractor licenses (plumber, electrician, etc.), a certificate of insurance, etc. Thus, the discussion of licenses, license holders, etc. herein should be understood to include, generically, any appropriate type of credentials, credential holders, etc. In some cases, it may be possible to combine different licenses, authorizations, credentials, etc. It is also possible to have a single instance that corresponds to all licenses, authorizations, credentials, etc. of a particular user.

The screen 100 may correspond to a display on a device of the license holder and may be viewed by the license holder either upon request or possibly in connection with the license holder providing a password, fingerprint, and/or some other type of authentication. Alternatively, the screen 100 may correspond to a screen on a device of a party other than the license holder (e.g., police officer, car rental agent, etc.) and the information provided on the screen 100 may be provided with or without the consent of the license holder, as described in more detail elsewhere herein. In some cases, information provided to a party other than the license holder may include an indication of what the license holder used to validate/authorize a particular request. The screen 100 may provide information that identifies the license holder, such a social security number of the license holder (possibly embedded within a QR/QC code), an image of a passport of the license holder, a picture id that contains a name and address of the license holder, an image of a driver's license of the license holder, an image of an auto license plate of the license holder, etc.

Figure 2:
FIG. 2 is a schematic illustration showing a screen with a subset of driver's license information thereon according to an embodiment of the system described herein.

Referring to FIG. 2, a screen 200 provided on a device is similar to the screen 100, discussed elsewhere herein, except that the screen 200 does not include all of the information provided on the screen 100. In some embodiments, the screen 200 may be presented on a device of the license holder in response to a specific input by the license holder to hide some of the information. For example, if the license holder uses the device/license to purchase liquor, the photograph, date of birth, and driver's license number may be useful, but the home address of the license holder is not necessary and, in some cases, the license holder may wish to prevent another party, such as a bartender, from seeing a home address of the license holder. Note that, instead of data of birth, it may be possible to provide (i.e., by default) just an indicator that the license holder is over 21. The license holder may control on an ad hoc basis which data is presented. For instance, the license holder may make a selection on their device not to display/send a home address when a relying party is, for example, a bartender.

In some cases, the role of a relying party may be provided to the license holder (i.e., electronically) and the information provided to the relying party may depend upon the role of the relying party. For example, if the relying party has a role of "law enforcement", then more information (e.g., home address) may be provided to the relying party than would be provided to a relying party having a role of "bartender". Note that there may be other types of roles, including "non-profit service provider" (such as teachers/instructors), "passport control", service providers acting on behalf of others (i.e. airline staff acting as preliminary passport control), regulatory personnel, etc. In some cases, the role information may be provided in a format that can be verified (e.g., digitally signed or otherwise be derived via a process of mutual authentication where the relying party is authenticated to the license holder along with some role identifying attributes that are sent via the mutual authentication). Using a format that can be verified prevents, for example, the license holder from authorizing information to be provided to someone fraudulently posing as a member of law enforcement. Mechanisms to verify the relying party are discussed in more detail elsewhere herein.

In some cases, particular information that is provided to the relying party may be a function of a role of a relying party and a distance between the relying party and the license holder, where different roles result in different maximum distances for authorizing providing information. For example, if the relying party has a role of "law enforcement", then the information may be provided to the relying party up to a distance of fifteen meters whereas if the relying party has a role of "bartender", the information may be provided only be up to three meters distance.

It is also possible to provide or not provide specific information based on contextual data, such as geolocation of the license holder and/or relying party, where, for example, a photograph of the license holder is not provided in locations where photographs are discouraged for religious reasons. Note that, in some cases, a subset of information is provided due to limitations in communication and/or of the receiving device, for example, in instances communication bandwidth limitations might cause any provided graphic image to be abbreviated (reduced in size/resolution).

Alternatively, license holder information may be transmitted to a device of a party other than the license holder so that, for example, the screen 200 is provided on a device of a bartender that needs to determine if it is appropriate to serve alcohol to the license holder. The amount and type of information provided to a relying party may be controlled so that different parties receive different information according to a roll of the relying party. For example, a relying party having a role of "law enforcement" may be provided with all of the driver's license information while a relying party having a role "commercial service provider" may be provided with a subset of the information that does not include the home address of the driver's license holder. The license holder may control on an ad hoc basis which data is sent to a recipient. For instance, the license holder may make a selection on their device not to display/send a home address when the relying party is, for example, a bartender, even if the relying party does not send role information to the device of the license holder. In some instances, the subset information provided may vary according to contextual data corresponding to a privacy level setting so that, for example, in some cases an actual data of birth is provided while in other cases only an indication that the license holder is over 21 is provided.

Referring to FIG. 3, a diagram 300 shows a network/cloud infrastructure 302, a license holder device 304, and a relying party device 306. The infrastructure 302 represents both communication mechanisms between the devices 304, 306, such as a cellular telephone network, and represents storage/ processing that may be performed on behalf of the devices 304, 306. For example, information about the license holder may be stored in cloud storage (the infrastructure 302) and then conveyed to the relying party device 306 upon occurrence of a particular event, such as the license holder entering a password, fingerprint (or similar) on the license holder device 304 to authorize transferring information from the cloud to the relying party device. It is also possible for the event to be simply close proximity of the devices 304, 306. For example, if the relying party is a law enforcement official, then it is possible to have the infrastructure 302 provide information about the license holder to the relying party device 306 in response to the license holder device 304 becoming proximate to the relying party device 306. Thus, for example, a bartender may gather together a group of N (for example 5) individuals (all within device proximity limitations), receive N notifications that each is authorized (over 21), and allow access to the facility to all of the individuals in the group.

In other embodiments, information may be transferred from the license holder device 304 to the relying party device 306 either through the infrastructure 302 or via a more direct link 308 therebetween. Note that the link can be any type of data communication mechanism, such as an Internet connection, WiFi, a Bluetooth connection, etc. In some embodiments, the devices 304, 306 may be connected to each other using a physical wire, such as an electrical wire, a Fiber-optic link, etc. Any appropriate type of contact, contactless, or proximity connection may be used. Information may be conveyed between the devices 304, 306 upon occurrence of a particular event, such as the license holder entering a password, fingerprint (or similar) on the license holder device 304 to authorize transferring information from the cloud to the relying party device close proximity of the devices 304, 306, as discussed elsewhere herein.

In some instances, the device 306 may be a laptop or desktop computer (or similar) and information may be provided to a relying party via a Web page (or similar) that the relying party accesses, possibly only after the license holder provides authorization. It is also possible to provide information to the relying party via an email that is sent by the license holder or by a proxy, possibly after authorization of the license holder. Note that, in some cases, it is possible for a relying party to not have a device at all but, instead, to visually inspect the license holder device 304 and/or take a photograph of the screen thereof.

Referring to FIG. 4, a flow diagram 400 illustrates steps performed in connection with the communications/cloud infrastructure 302 providing information to a relying party. Processing begins at a first step 402 where a request is received. In some embodiments, the relying party requests the information from a license holder so the request received at the step 402 is from the relying party. In other embodiments, the request may be provided by the license holder to send the information to the relying party so that the request received at the step 402 is from the license holder. In either case, the request may include one or more tokens, or similar, which is a data element that contains information about the license holder but does not directly identify the license holder (and may or may not directly identify the relying party).

In instances where an identity is indirectly tied to the license holder, an external database may map a token to the identity of the license holder. The external database/data used for mapping may be separate from any other database/data containing personal information about the license holder. Following the step 402 is a step 404 where the token(s) are matched by the infrastructure 302 to information for the license holder and/or the relying party. In some cases, the token(s) may indicate where to retrieve the requested license information and possibly required access information (i.e., credentials for remote systems that are accessed). Following the step 404 is a test step 406 where it is determined if the request is authorized. As discussed elsewhere herein, it may be necessary for the license holder to provide authorization in the form of a password, fingerprint, etc. In some cases, the license holder may need to provide a release (possibly in the form of an access token) to authorize the relying party to read the license information and/or access license information from the cloud, including possibly information about insurance. Note that authorization may include having the relying party (e.g., a police officer) present their device to the license holder who then provides a password, a fingerprint, etc. to the device of the relying party. As discussed in more detail elsewhere herein, there may be mechanisms to ensure authorization/identity of the relying party.

If it is determined at the 406 that the request is not authorized, then processing is complete (i.e., no information will be provided or only information indicating that the request was not authorized). Otherwise, control transfers from the test step 406 to a step 408 where the requested information is encrypted with a dynamic element (to guard against replay attacks). Following the step 408, control transfers to a step 412 where the requested information is sent to the relying party. Following the step 412, processing is complete.

Figure 5:
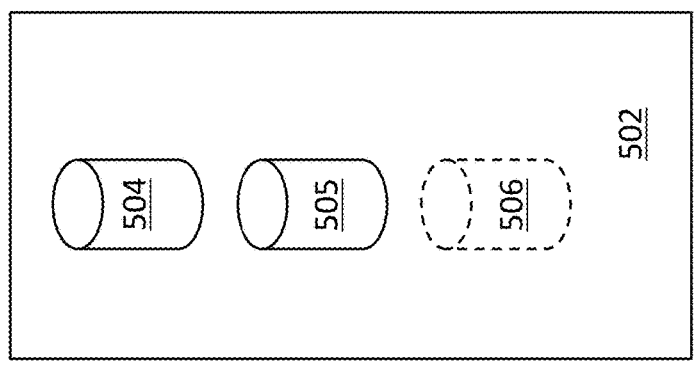
FIG. 5 is a schematic illustration showing a license holder device containing license/credential information, an authentication cryptogram, and possibly policy information according to an embodiment of the system described herein.

Referring to FIG. 5, a mobile device 502, such as a smartphone, includes a cryptograph key 504 (possibly a unique cryptographic key) that is securely provisioned in the mobile device 502. The mobile device 502 may be used by a license holder in connection with the system described herein. The cryptographic key 504 may be a symmetric key or part of an asymmetric private/public key pair. The mobile device 502 also includes license data 505 that contains information for license(s)/credentials provided with the mobile device 502. The license data 505 may include one or more visual images of the license holder that are displayed on the mobile device 502 as well as information and/or graphical images for indicating information associated with the license(s)/credentials, such as date of birth, specific authorizations, etc.

The mobile device 502 may optionally include policy data 506, which provides information regarding operation/use of the corresponding license(s)/credentials. For example, the policy data 506 may include information that causes home address information for the license holder to be withheld if the relying party has a role of "bartender". Other policy information may indicate whether it is permissible to have the license data 505 stored on other devices in addition to the mobile device 502. Note that, as discussed elsewhere herein, it is possible for some or all of the policy information for the license data 505 and corresponding virtual license(s) to be stored elsewhere, such as in the network/cloud infrastructure 302, discussed elsewhere herein.

The cryptographic key 504 may be used (e.g., by the mobile device 502) to generate a cryptogram that validates the license data 505. In an embodiment herein, a relying party may use the cryptogram to ensure that the license holder is presenting valid data. For example, if the license data 505 corresponds to a motor vehicle license, then the cryptogram may include the license data digitally signed with the cryptographic key 504, which may be a private key corresponding to a public key of an issuing authority, such as a state motor vehicle department. In another embodiment, the cryptogram may include a private key corresponding to a public/private key pair specific to the license with a public license key additionally signed by an issuing authority and a public key of the issuing authority attached, concatenated or stored with the public license key. Note that it is possible to use any appropriate cryptographic information associated with the license holder to generate the cryptogram. Thus, for example, instead of the cryptographic key 504 stored on the mobile device 502, it is possible to use other information associated with the license holder, but stored in another location, such as in the cloud, to generate the cryptogram.

A relying party, such as a police officer, may then validate the license data by applying the public key to the cryptogram which results in the license data 505 if the license data 505 is valid. Other values/information may be used with the cryptographic key 504 to generate the cryptogram, such as an event counter, a time stamp, a nonce, etc. Other possible values/information include a unique identifier for the virtual license, a unique identifier for a user identifier that is mapped to the virtual license, an indicator of a particular type (e.g., driver's license, fishing license, etc.) of the virtual license/credential, one or more identifiers that collectively describe or identify service(s) that may be used to verify the authenticity of the virtual license/credential (i.e., a verification service), an identifier of a party that issued the virtual license/credential, etc.

In some instances, the same license data 505 may be provided on multiple devices, but each of the devices may have a different cryptographic key. Of course, it is also possible for some or all of the multiple devices to use the same cryptographic key. In some cases, the cryptographic key 504 may only be valid for a finite amount of time after which a replacement cryptographic key is provided. Information regarding operation, limits, range, etc. of the cryptographic key 504 may be provided by the policy data 506. The cryptogram may be regenerated (changed to an unpredictable value) for each verification to prevent a replay.

The mobile device 502 may provide information to a different device (not shown in FIG. 5) for validation. The different device may be a mobile device of a relying party. In some embodiments, the cryptogram 504 and possibly some or all of the license data 505 and possibly some or all of the policy data 506 may be encoded within a bar code that is displayed on the mobile device 502. The relying party may then take a photo of the bar code or otherwise visually input the bar code for verification. In another embodiment, the cryptogram 504 and possibly some or all of the license data 505 and possibly some or all of the policy data 506 may be encoded into a digital watermark within an image of the virtual license displayed on the device 502. The relying party may then take a photo of the image with the watermark or otherwise visually input the image with the watermark for verification. Generally, the cryptogram 504 and possibly some or all of the license data 505 and possibly some or all of the policy data 506 may be encoded into a visual image that is provided to a device of the relying party. In other embodiments, the cryptogram 504 and possibly some or all of the license data 505 and possibly some or all of the policy data 506 may be communicated to the relying party using NFC, Bluetooth, or similar. It is also possible for the cryptogram 504 and possibly some or all of the license data 505 and possibly some or all of the policy data 506 to be communicated to the relying party via a non direct channel, such as email or SMS.

Figure 6A:
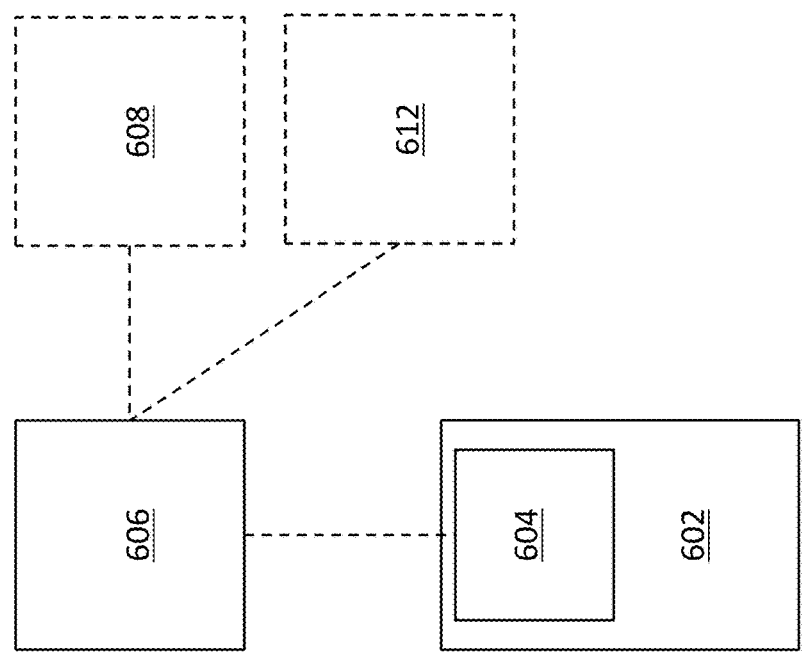

Referring to FIG. 6A, a device 602 (verifying device) of a relying party has received from a license holder information that requires validation (e.g., the cryptogram 504 and possibly some or all of the license data 505 and possibly some or all of the policy data 506). The device 602 may be a mobile device, such as a smartphone, that runs a verification app 604 to verify the received information. The verification app 604 may receive the information that requires validation and may then determine a URL of a validation service 606 (separate from the device 602) capable of verifying the information that requires validation. After determining the verification service 606, the verification app 604 may invoke the verification service 606 by transmitting the information that requires validation (including, in some cases, the cryptogram) to the verification service 606. Invocation of the verification service 606 may be logged by the verification service 606, providing an auditable record of each verification request. The verification service 606 may validate the information that requires validation and respond with a verified version of the license data 505, an image corresponding to an image from the license data 505, or some other data. Note that, in some cases, the verification service 606 may return an indication that the information is not valid. Information may not be valid for any number of reasons, such as the information being fraudulent. In some cases, the information may be deemed not valid by the verification service 606 for other reasons, such as expiration of a license.

The data/image returned by the verification service 606 to the verification app 604 may depending on a number of factors, including, possibly, information provided by the policy data 506, the type of license (e.g., driver's license, fishing license, etc.), the role of the relying party (e.g., police officer, bartender, etc.), and/or other contextual information that may be provided by the verification app 604 to the verification service 606. Note that some or all of the contextual information may be generated by the device 602 and/or provided to the verification app 604 by other local devices, separate from the device 602 (and possibly separate from the device 502 of the license holder), such as Bluetooth beacons or RFID tags. In some cases, contextual information may include speed information for an Internet connection used by the device 602, which may allow adjustment of volume of data, image formats, etc. returned by the verification service 606. Similarly, the verification app 604 may identify whether the verification app 604 is running on a laptop or mobile phone (i.e., whether the device 602 is a laptop or mobile phone), which may allow adjustment of volume of data, image formats, etc. returned by the verification service 606.

In some embodiments, the verification app 604 may be able to provide evidence of the trustworthiness of the endpoint device on which the verification app 604 is executing. For example, the verification app 604 may indicate that the device 602 been "jail broken" or that the verification app 604 is being executed in a trusted environment, such as Samsung Knox device. The level of trustworthiness may allow adjustment of a type of data returned by the verification service 606. In some cases, there may be multiple different implementations/configurations of the verification app 604 so that the verification service 606 returns one data set to a version of the verification app 604 that is used exclusively by police officers and returns another, different, data set to a different version of the verification app 604 that is optimized for use by park rangers or optimized for use by bar staff to verify proof of age or used by homeowners to verify a contractor license and retrieve insurance details. In some embodiments, a particular data set that is returned by the verification service 606 may vary depending on a physical location of the device 602 executing the verification app 604 or on a time of day. If the verification service 606 is not able to respond in real time to the verification app 604, the verification service 606 may process a request from the verification app 604 offline and issue, at a later date, a notification to the verification app 604 containing the requested verification information. Mechanisms for verifying authorization/identity of devices used by the relying party and the license holder are discussed in more detail elsewhere herein.

The verification app 604 may parse images and/or data returned by the verification service 606 and highlight contextually relevant aspects for a relying party using the device 602. For example, if the verification app 604 is used for a hunting license, the verification app 604 may indicate whether the license is valid for a location at which verification is taking place. As another example, the verification app 604 may be used by bar staff and thus may highlight to the relying party if the license holder is not old enough to drink alcohol. As yet another example, the verification app 604 may be used by a police officer and therefore may be capable of performing a biometric match such as a facial recognition, iris scan, and/or fingerprint check, by comparing a photo or fingerprint taken by the officer with image/data information returned by the verification server. The verification app 604 may provide an option for a relying party to record a result of a successful or unsuccessful verification. The result may be recorded on the verification server 606, a different server 608, and/or with the verification app 604.

The verification service 606 need not store all data that needs to be returned to the verification app 604. The verification service 606 may redirect the verification app 604 to a secondary service 612, passing a token that is trusted by the secondary service 612 so that the secondary service 612 provides requested information back to the verification app 604. For example, there may be a fishing license database that is separate from the verification service 606 so that the verification service 606 redirects the verification app 604 to a separate service that accesses the fishing license database to provide information to the verification app 604.

Referring to FIG. 6B, in some embodiments, the verification app 604 may not communicate directly with a verification service. Instead, the verification app 604 communicates through an intermediary service 614 that acts as an aggregator across multiple verification services 606a-606c. The intermediary service 614 may play an active role in determination of which of the verification services 606a-606c to use. An example of an intermediary service would be a service that aggregates information on many licensed contractors across multiple fields of professional expertise (similar to how the Angie's List service works). In some instances, the intermediary service 614 may provide the verification app 604 to the relying party.

Figure 7:
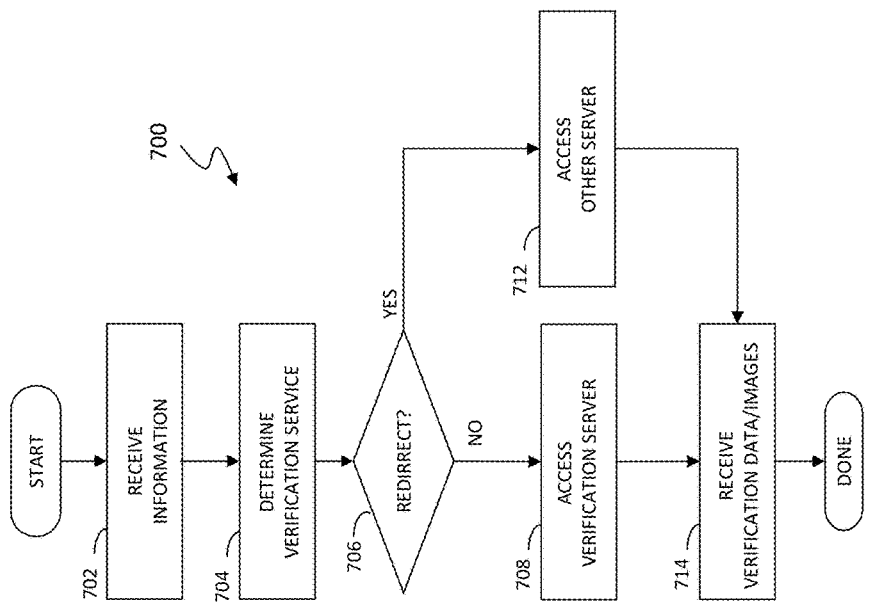
FIG. 7 is a flow diagram illustrating processing performed by a verifying device according to an embodiment of the system described herein.

Referring to FIG. 7, a flow diagram 700 illustrates steps performed by a device of a relying party in connection with validating information from a license holder. Processing begins at a first step 702 where the device of the relying party receives information from the license holder, either directly or through a cloud service (or similar) as discussed elsewhere herein. The information may include a cryptogram, license data, policy information, etc. Following the step 702 is a step 704 where a verification service is determined. As discussed elsewhere herein, the device of the relying party may contain one or more URLs for different verification services where a particular one of the URLs is chosen based on information provided by the license holder. Alternatively, the license holder may provide the URL, which may be digitally signed (or similar). A URL provided by the license holder may contain embedded security features such as a One Time Password that may be validated by the authentication server to guard against a replay of an earlier request.

Following the step 704 is a test step 706 where it is determined if the device of the relying party is being redirected to another server for verification data. As discussed elsewhere herein, in some cases a relying party may be directed to a different server for information. If not, then control passes from the test step 706 to a step 708 where the device of the relying party accesses the verification server. Otherwise, control passes from the test step 706 to a step 712 where the device of the relying party accesses an other server. Following the step 708 or the step 712 is a step 714 where the device of the relying party receives verification information, as discussed elsewhere herein. Following the step 714, processing is complete.

The system described herein may have many possible uses. For example, a hotel receptionist may use a mobile phone (receptionist mobile phone) to validate authenticity of a driver's license presented on a mobile phone of a guest (guest mobile phone) checking in to the hotel. The guest begins by opening a driver's license app on the guest mobile phone. The driver's license app displays a virtual representation of a driver's license, including a license number, a name of the guest, a date of birth of the guest, an address of the guest, an expiry date, and a photo of the license holder. The guest may then touch the image of the driver's license displayed on the guest mobile phone, which responds by generating and displaying a 2-D barcode. The 2-D barcode has encoded therein information indicating an issuing state of the driver's license, a license number, and an authentication cryptogram. The receptionist opens a driver's license verification app on the receptionist mobile phone and uses the verification app to take a photo of the 2-D barcode displayed on the guest mobile phone. The verification app decodes the 2-D barcode and connects to a trusted verification service corresponding to a particular state that issued the driver's licenses, passing the license number and the authentication cryptogram. The trusted verification service validates that the submitted authentication cryptogram is valid for the license number passed thereto and responds with a pre-constructed image of the driver's license of the guest. The pre-constructed image, which may include a photo, name, date of birth, etc., is displayed on the receptionist mobile phone. The receptionist is able to do a visual comparison of the image of the license displayed on the receptionist phone with an image of the license displayed on the guest mobile phone, thereby enabling the receptionist to confirm authenticity of the mobile driver's license of the guest.

An alternative example relates to enabling a police officer to use a mobile phone (verifying device) to validate authenticity of a driver's license (license holder device). Initially, the driver opens a license app on the license holder device, which may be a smartphone or a tablet. The license app displays an image corresponding to a driver's license, including a license number, name, date of birth, address, expiry date and a photo of the driver (license holder). The police officer opens a driver's license verification app on the verifying device, which also may be a smartphone or tablet, but could also be a laptop or other type of computing device. The driver may then touch the image of the driver's license displayed on the license holder device, which responds by generating an authentication cryptogram. The authentication cryptogram is transmitted to the verifying device (using, for example, Bluetooth Smart technology or some other type of appropriate communication system) along with information indicating an issuing state and a license number. The verification app then connects to a verification service for the issuing state, passing the license number and the authentication cryptogram. The verification service validates that the submitted authentication cryptogram is valid for the license number and responds to the verifying device with confirmation of authenticity for the driver's license, plus (possibly) additional relevant information regarding the driver. The information received by the verifying device is displayed on the verifying device for the police officer to view.

Yet another example illustrates a consumer using a mobile phone (or similar device) to validate authenticity of a license presented by a contractor, taxi driver, real estate agent or other licensed professional and to verify insurance details of the licensed professional. Initially, the licensee opens a professional license app on a license holder device, which may be a mobile phone, a tablet, or similar. The license app displays an image corresponding to a license to practice, including information such as a license number, name, professional services that the license holder is licensed to practice, expiry date and a photo of the licensee. The licensee then touches the image on the license holder device, which responds by generating and displaying a 2-D barcode, into which is encoded an issuer of the license, the license number, a type of license (e.g., electrical, plumping, etc.), a signed URL that identifies a trusted verification service and an authentication cryptogram. The consumer opens a license verification app on a verifying device (the mobile phone, or similar, of the consumer) and uses the license verification app to take a photo of the 2-D barcode displayed on the license holder device. The verification app decodes the 2-D bar code, confirms the signature of the URL, and connects to the trusted verification service, passing the license number and the authentication cryptogram. The trusted verification service validates that the submitted authentication cryptogram is valid for the license number and responds with a confirmation of validity and details on an insurance policy of the licensee. The verification app may subsequently provide supplementary services such as verifying that the insurance of the licensee is valid to cover a proposed work schedule.

Referring to FIG. 8A, a diagram 800 shows an alternative embodiment having the network/cloud infrastructure 302 and the license holder device 304, but without the relying party device 306 (or without the relying party device 306 connected to the network/cloud infrastructure 302 and the license holder device 304). The network/cloud infrastructure 302 includes template data 802 that contains information used to adjust what information and/or visual characteristics of information displayed on the license holder device 304. A relying party determines validity of credentials on the license holder device 304 based on what is displayed thereon, as described in more detail elsewhere herein.

The template data 802 indicates specific information and/or conditions that determine what is to be displayed on the license holder device 304. Visual characteristics that may be varied include a location on the display of the license holder device 304 where a photo of the license holder is shown (e.g., top left, top right, center, etc.), the font used, the color of text used, the color scheme of the existing image (e.g., the background may change from light gray to dark gray), and/or a specific image that may not otherwise be part of the credentials of the license holder (e.g., a pine tree). Note that information that is selectively not displayed may be used as a means of visually verifying the license holder. For example, the template data 802 may indicate specific fields to be omitted from the display on the license holder device 304. As discussed elsewhere herein, information that may be displayed on the license holder device 304 includes name, address, date of birth, license number, etc. Each item to be displayed may be may individually set with a particular font, font color, size, position, etc., or all items may be set together.

Conditions may be used to determine the specific configuration of the display on the license holder device 304. For example, the template data 802 may indicate use of different font colors at different times of day. The template data 802 may be configured periodically (e.g., once per day) by an administrative entity and/or a relying party to a visual state that is known to the relying party, but otherwise not generally known. Thus, a relying party, such as a police officer, could expect on a certain day that the font is red from 9:00 am to 11:00 am, green from 11:00 am to 1:00 pm, etc. This information would not be known to a license holder, and thus it would be difficult for a license holder to generate fraudulent credentials.

In some cases, the verifying party may provide information to the license holder to confirm the identity of the verifying party. For example, a verifying party could verbally provide an alphanumeric value to the license holder (i.e., a "key"), which the license holder would then input into the license holder device 304 that transmits the value to the network/cloud infrastructure 302 for verification/identification. This is explained in more detail elsewhere herein. The conditions provided with the template data 802 could include different visual effects based on an identity of the relying party. For instance, different fields to be displayed and not displayed on the license holder device 304 could be specified for different police officers (relying parties). Also, as discussed elsewhere herein, the fields that are displayed may depend, at least in part, on a role of the relying party. In addition to the identity/role of the relying party, other conditions/parameters may be used including a time of day, a physical location of the license holder device 304, a work schedule of a relying party (possibly in combination with the time), the state of equipment associated with the relying party (e.g., for a police officer, an indication of whether body camera is enabled or disabled), the last time a relying party had connectivity, etc.

As discussed elsewhere herein, prior to inspection, the verifying party (and/or a different authorized entity) establishes (pre-defines) template rules and visual components for different conditions, such as a given location, a time period, etc. Visual components to be associated with a given combination of conditions may use an application on the license holder device 304 that manages presentation of the visual components that includes a visual presentation of credential information. When the application needs to provide the visual representation of the credential information, the application connects to the network/cloud infrastructure 302 and authenticates with a service. The application may provide the service with information about a physical location of the license holder device 304, a time of day, etc. Some data elements (such as time of day) may already be known at the license holder device 304 and not necessarily sent to the license holder device 304.

The application on the license holder device 304 may send a proof of identity to the network/cloud infrastructure 302. The proof of identity may be in a form of an HMAC message using a private key protected in some form on the license holder device 304. The network/cloud infrastructure 302 may fail to respond, or respond with inaccurate information, if the proof of identity is not correctly provided. Note that, if the license holder device 304 is a mobile phone, the proof of identity may include a phone number of the mobile phone. The network/cloud infrastructure 302 may dynamically generate a visual representation of credentials of the license holder (and possibly other visual components) that is sent to the license holder device 304 and displayed for view by the relying party. The relying party views the display on the license holder device 304 and confirms (or not) that the display matches expectations based on conditions (e.g., between 9:00 am and 11:00 am, the font is red). Alternatively, the network/cloud infrastructure 302 may select a record from the template data 802 that is appropriate for the application on the license holder device 304 to reconstruct appropriate visual components and sends the record back to the application. For example, the network/ cloud infrastructure 302 could return to the application a template to cause the application to display a photo of the license holder in an upper left portion of the display and to use courier font in green. The relying party inspects the image on the license holder device 304 and, if the image is correct (i.e., if the image is as expected) the relying party can be confident that the credentials provided by the license holder are authentic. In some embodiments, it may be possible to present an image on the display (e.g., a tree) that changes into another (expected) image from when tapped (e.g., a tree changes into an image of a saw when tapped).

Figure 8B:
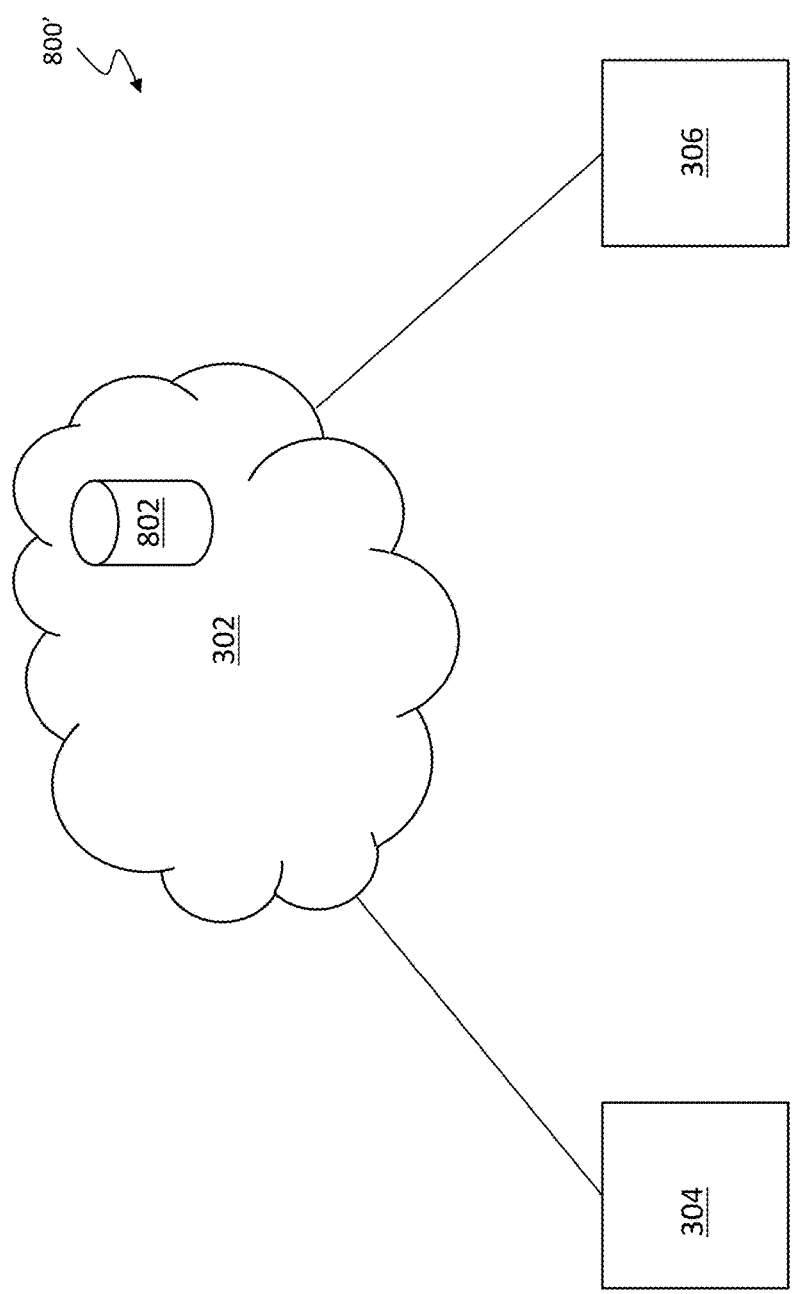

Referring to FIG. 8B, a diagram 800' shows an alternative embodiment having the network/cloud infrastructure 302, the license holder device 304, and the relying party device 306 where the relying party device 306 does not communicate directly with the license holder device 304. In the embodiment illustrated by the diagram 800', both the license holder device 304 and the relying party device 306 are connected to the network/cloud infrastructure 302. The network/cloud infrastructure 302 includes the template data 802, discussed elsewhere herein, that contains information used to adjust what information and/or visual characteristics of information displayed on the license holder device 304. As with the embodiment illustrated with the diagram 800, the relying party determines validity of credentials on the license holder device 304 based on what is displayed thereon. Note that the embodiment illustrated by the diagram 800' allows for all of the verification mechanisms discussed herein in connection with the embodiment illustrated by the diagram 800, but also allows for additional verification operations.

A table lookup may be used to identify an image on the license holder device 304 and a formula may be used to place the image in a particular location on the display. For example, L could be a location of the license holder device 304 normalized to a desired range or even indexed to a zone derived from coordinates such as GPS coordinates or other location information gathered by location services of an underlying phone OS platform. T could be a time of the day truncated to a desired change interval. K could be a secret key protected in some form on the license holder device 304. Then, an index I into an icon databank in the template data 802 could be I=HMAC(L+T, K) MOD (number of images in the database). The license holder would present the image on the license holder device 304 along with appropriate credentials for the license holder. The relying party would receive the same image from the network/cloud infrastructure 302 along with, for example, an image (photo) of the license holder, date of birth, etc., possibly using, in addition, correct (expected) fonts, correct (expected) color schemes, etc. In instances where multiple images are presented, the relying party device 306 could allow the relying party to tap the image and see dynamic images in a sequence that the relying party expects to see on the license holder device 304. In some cases, the relying party could receive updates 306 (using, for example, text or email) to the relying party device 306 of dynamic images to expect. The timing of the updates could be driven by changes in the data (for example by changing geographic locations, as time changes, etc.). Thus in cases where the relying party loses access to database, the image displayed on the license holder device 306 may be driven by a last connectivity of the relying party.

Note that the system described herein may be implemented in situations where the relying party device 306 has connectivity to the network/cloud infrastructure 302 and connectivity to the license holder device 304, as illustrated in the diagram 300 of FIG. 3, described above. The relying party device 306 may receive images that are the same as images displayed on the license holder device 304 so that the relying party can examine the relying part device 306 to confirm a match with the display of the license holder device 304. Note that the relying party and/or the license holder may refresh using data from the template data 802 at any time.

As an example, the system described herein could enable a supermarket cashier to verify authenticity of a mobile driver's license presented as proof of age when purchasing alcohol. The cashier (and/or a supervisor, agent, etc. thereof) could pre-determine a template, color scheme and visual components at a location of the supermarket. Pre-determining the template could be done from multiple devices, or refreshed by a smart device of the cashier that assists with verification. A customer requested to provide proof of age would open the driver's license app on the device (e.g., smartphone) of the customer. The driver's license app would display driver's license information of the customer that has been formatted using the pre-determined template, color scheme and imagery unique to the location of the supermarket at the particular time.

Additionally, some aspect of the way in which the credential is presented might be a function of attributes of the credential. For example, an image presented for customers with last names beginning with A-K might be different than that presented for customers with last names beginning with L-Z. The license holder device presenting the image might also collect additional environmental measures detected by sensors on the device, such as levels of background noise or light, which would be sent to the network/cloud infrastructure (or similar) as determinants in generation of the image. In some cases, data, such as location and environmental measures, could be hashed or some other mechanism used to prevent the network/cloud infrastructure from being able to determine and record the actual physical location of the license holder device.

Note that an authentication check to retrieve template data could require input from the authenticating environment; for example, without a unique id of the relying party, the network/cloud infrastructure may refuse to return the template to the license holder device where the unique id might come directly from the relying party via wireless communication, or may be manually entered by the license holder based on verbal input from the relying party so that license holders may be prevented from learning the pattern of visual images to expect. An application used for verification may have a feature to dial, text, or otherwise contact an application on the license holder device. The license holder device may be a smartphone and a phone number of the smartphone may be released visually (displayed) by an application on the license holder device when retrieving the template, released to the network/cloud infrastructure, and then shared with the relying party device, released to the relying party device from an application on the license holder device, verbally shared by the license holder, and sent to the network/cloud infrastructure by the relying party device, etc.

In some embodiments, a text message may trigger a unique sound associated with the verification process. For instance, instead of a single tone to associate with the all text messages, a unique message sound may be sent with the template data or text communication. The unique sound may be defined as a part of the template, or dynamically sent by the relying party (possibly triggered from an image on an application on the relying party device). Thus, for example, a simple finger press of a photo of the license holder on the relying party device may automatically send a request to issue an audible alarm at the license holder device.

Figure 9B:
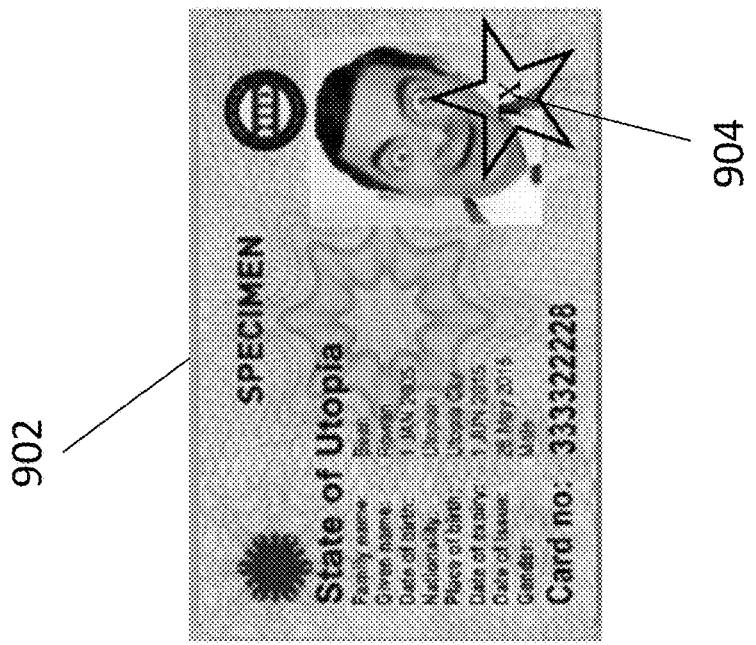
FIGS. 9A and 9B illustrate mobile credentials of a license holder along with an image superimposed thereon according to an embodiment of the system described herein.
Figure 9A:
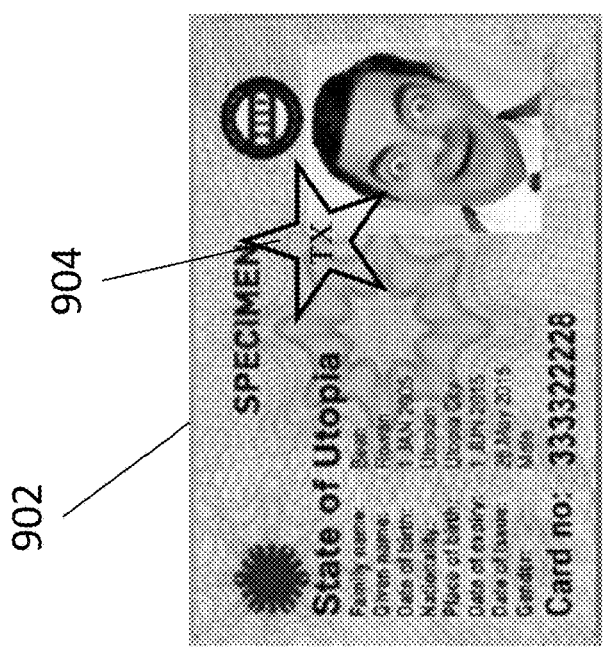

Referring to FIG. 9A, a display 902 shows mobile credentials of a license holder along with an image 904 superimposed thereon. As described in more detail elsewhere herein, a location of the image 904 and possibly the particular image 904 itself may depend upon conditions, such as a time of day, location, identity of the relying party, etc. Thus, a relying party, such as a police officer, may visually inspect the display 902 and determine validity of the credentials thereon based on the image 904. FIG. 9B shows the display 902 with the image 904 in a different location on the display 902, which corresponds to different conditions, such as a different time of day, location, etc. Note that it is also possible for FIG. 9B to represent a fraudulent version of the credentials so that, for example, the image 904 in FIG. 9B is not in a location that corresponds to an expected location based on conditions; in such a case a relying party viewing the display 902 in FIG. 9B would be able to visually determine that the corresponding credentials are fraudulent.

Referring to FIG. 10, a diagram 800" shows an alternative embodiment having the network/cloud infrastructure 302, the license holder device 304, and the relying party device 306 where the relying party device 306 communicates with the license holder device 304 and the license holder device 304 is connected to the network/cloud infrastructure 302. The relying party device 306 may have intermittent communication with the network/cloud infrastructure 302 or may have no communication at all therewith, as illustrated by a dotted line connecting the relying party device 306 with the network/cloud infrastructure 302. Similarly, the license holder device 304 may have intermittent communication with the network/cloud infrastructure 302 or may have no communication at all therewith, as illustrated by a dotted line connecting the license holder device 304 with the network/cloud infrastructure 302.

As discussed elsewhere herein, the relying party device 306 is used to verify/confirm credential information provided by the license holder device 304. In some cases, the information may be provided directly from the license holder device 304 to the relying party device 306 while in other instances at least some of may be provided to the relying party device 306 from the network/cloud infrastructure 302. In an embodiment herein, the license holder device 304 attempts to receive as much of the desired information as possible from the network/cloud infrastructure 302. There may be any number of reasons why this may be desirable, including faster and/or more efficient data transmission, improved security, etc. Of course, in instances where the relying party device 306 is not connected to the network/cloud infrastructure 302 (either by design or because of a poor connection), then all of the desired credential information may be provided directly from the license holder device 304 to the relying party device 306. In some instances, the relying party device 306 may communicate directly (or indirectly) with the with the license holder device 304 to indicate connectivity status between the relying party device 306 and the network/cloud infrastructure 302, where the connectivity status may include and/or take into account one or more of: historical, expected, or presumed error rate and/or throughput rate.

Authorization for the network/cloud infrastructure 302 to release information to the relying party device 306 may be provided by data transferred from the license holder device 304 to the network/cloud infrastructure 302, data transferred from the relying party device 306 to the network/cloud infrastructure 302, and/or data from the license holder device 304 that is relayed to the network/cloud infrastructure 302 by the relying party device 306. In the case of relaying the authorization data, the license holder device 304 may also provide url information (pointing to the network/cloud infrastructure 302) to the relying party device 306. For example, if the relying party device 306 is requesting information from the network/cloud infrastructure 302 for a particular license holder device 304, the license holder device 304 may first send authorization data to the relying party device 306 along with a url pointing to the network/cloud infrastructure 302. In other cases, the relying party device 306 may be authorized to receive information without any need for separate authorization data (e.g., the relying party device 306 of as police officer making a traffic stop). In some instances, authorization may be triggered by proximity of the devices 304, 306, with or without additional input from the license holder device 304.

Upon receipt of appropriate authorization, the network/cloud infrastructure 302 retrieves credential information corresponding to the license holder device 304 and then makes the credential information available for retrieval by the relying party device 306. In some cases, the network/cloud infrastructure 302 issues a token that may be used by the relying party device 306 for subsequent requests for credential information.

Figure 11:
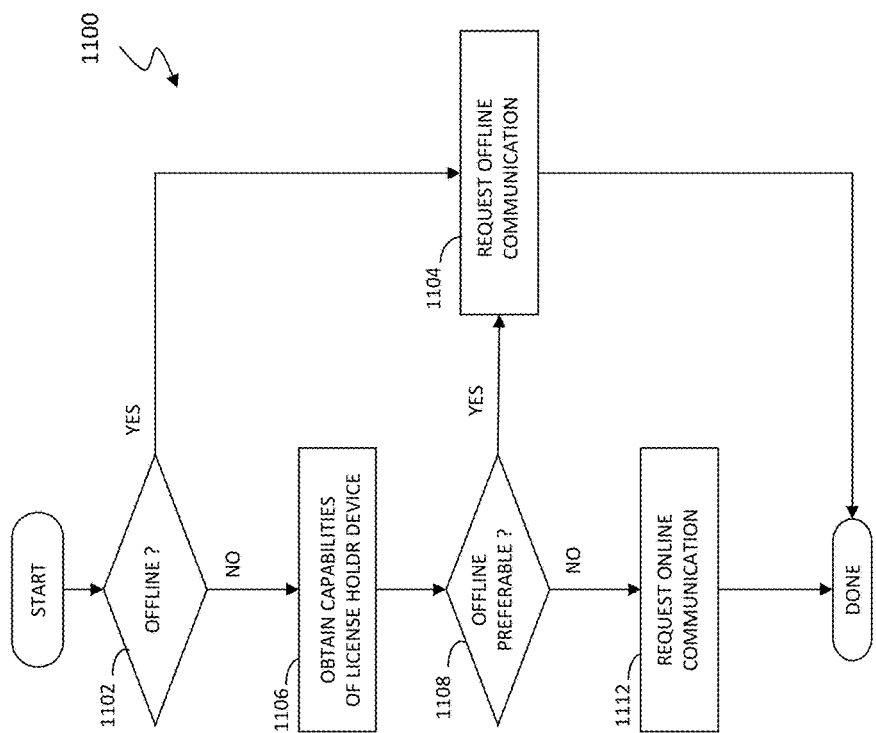
FIG. 11 is a flow diagram illustrating processing performed by a relying party device in connection with obtaining information about the license holder from a license holder device according to an embodiment of the system described herein.

Referring to FIG. 11, a flow diagram 1100 illustrates processing performed by the relying party device 306 in connection with obtaining information about the license holder from the license holder device 304. Processing begins at a first step 1102 where it is determined if the relying party device 306 is offline (i.e., not able to obtain information from the network/cloud infrastructure 302). If so, then control transfers from the test step 1102 to a step 1104 where the relying party device 306 communicates with the license holder device 304 to initiate communication therewith in offline mode, where all data is transferred directly between the relying party device 306 and the license holder device 304 without using the network/cloud infrastructure 302. In some cases, the relying party device 306 and the license holder device 304 may negotiate how much and which data to transfer. For example, if the bandwidth/data transmission speed is relatively low, then the license holder device 304 may transmit a relatively grainy photographic id of the license holder to the relying party device 306 while if the bandwidth/data transmission speed is relatively high, then the license holder device 304 may transmit a photographic id of the license holder having a better resolution (and using more data) to the relying party device 306. Following the step 1104, processing is complete.

If it is determined at the test step 1102 that the relying party device 306 is not restricted to offline operation only (i.e., the relying party device 306 can communicate with the network/cloud infrastructure 302 as well as the license holder device 304), then control transfers from the test step 1102 to a step 1106 where the relying party device 306 queries the license holder device 304 to obtain the capabilities thereof. Note that the relying party device 306 can choose whether to obtain specific information from either the license holder device 304 or the network/cloud infrastructure 302, where the choice may be based on one or more factors, such as relative speed/throughput of the different data sources, relative costs of data transmission, specific data available at each of the sites, etc. Note also that, in some instances, there may be a strong preference for online communication. For example, if the relying party is a bartender in an establishment having a local WiFi/LAN connection to the Internet, then the relying party device 306 may always elect to use online communication whenever possible.

Following the step 1106 is a test step 1108 where it is determined whether the relying part device 306 and the license holder device 304 will use online communication or offline communication. If it is determined at the test step 1108 that it is preferable to employ offline communication (i.e., direct communication between the license holder device 304 and the relying party device 306), then control transfers from the test step 1108 to the step 1104, discussed above, where offline communication is initiated. Otherwise, if online communication is preferable, then control transfers from the test step 1108 to a step 1112 where online communication is initiated. Online communication and offline communication are described in more detail elsewhere herein. Following either the step 1104 or the step 1112, processing is complete. Note that the processing illustrated by the flow diagram 1100 may be performed for an entire session between the license holder device 304 and the relying party device 306 (i.e., all data exchanged therebetween) or may be performed on an element-by-element basis so that, for example, some data elements are received by the relying party device 306 from the network/cloud infrastructure 302 while other data elements are received by the relying party device 306 directly from the license holder device 304.

In some instances, specific information may be required for a particular transaction/type of operation, and this may determine whether the relying party device 306 receives information from the license holder device 304 or the network/cloud infrastructure 302. For instance, a traffic stop may require that the police officer (that uses the license holder device 306) receive a photograph of the license holder, which, in some cases, may only be available on the license holder device 304 (or possibly only available at the network/cloud infrastructure). As another example, the license holder may only be allowed to drive certain types of vehicles and, in some cases, this information may only be reliably provided by the network/cloud infrastructure 302.

Figure 12:
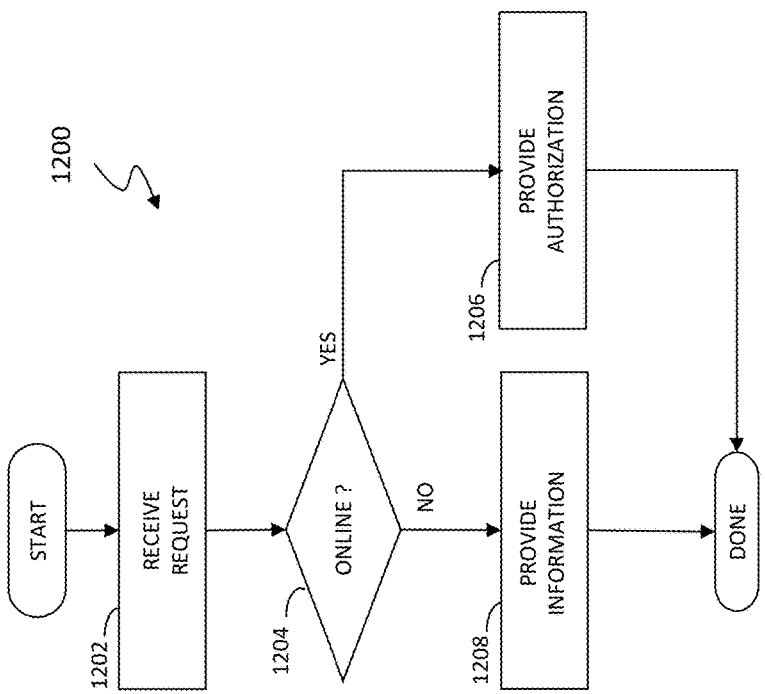
FIG. 12 is a flow diagram illustrating processing performed by a license holder device in connection with receiving a communication request from a relying party device according to an embodiment of the system described herein.

Referring to FIG. 12, a flow diagram 1200 illustrates processing performed by the license holder device 304 in connection with handling a request from the relying party device 306. Processing begins at a first step 1202 where the license holder device 304 receives the request. Following the step 1202 is a test step 1204 where it is determined if the relying party devices 1206 intends to receive desired information online (i.e., from the network/cloud infrastructure 302). As discussed elsewhere herein, the relying party device 306 may opt to not receive any information from the network/cloud infrastructure 302 either out of necessity (e.g., there no connection between the relying party device 306 and the network/cloud infrastructure 302) or by choice, possibly based on an appropriate metric that is used. If it is determined at the test step 1204 that the relying party device 306 is to receive validation information from the network/cloud infrastructure 302, then control transfers from the test step 1204 to a step 1206 where authorization data is provided by the license holder device 304 to either the relying party device 306, the network/cloud infrastructure 302, or both, as discussed elsewhere herein. Providing authorization at the step 1206 is discussed in more detail elsewhere herein. Following the step 1206, processing is complete.

If it is determined at the test step 1204 that the relying party device 306 is to receive validation information directly from the license holder device 304 (i.e., is "offline"), then control transfers from the test step 1204 to a step 1208 where requested information is provided directly by the license holder device 304 to the relying party device 306. The information may be provided at the step 1208 using any appropriate mechanism, such as a conventional key exchange followed by exchanging encrypted data. As discussed elsewhere herein, the request from the relying party device 306 and/or the data from the license holder device 304 may be digitally signed (or similar) for verification and/or non-repudiation. Also, as discussed elsewhere herein, at least some of the validation information may be displayed on the relying party device 306. Note that displaying data may occur irrespective of the source of the information (i.e., the network/cloud infrastructure 302 or the license holder device 304). Following the step 1208, processing is complete. Note, by the way, that specific data that is transmitted (and/or the form of the data) could depend, at least in part, on whether the relying part device 306 is receiving the data in online mode or offline mode.

In an embodiment herein, the license holder device 304 may store verification keys that are used to generate a credential verification cryptogram (CVC) that can be verified by the network/cloud infrastructure 302 prior to releasing credential information to the relying party device 306. The CVC could be a one-time password (OTP) that uses an HMAC OTP algorithm (HOTP). In other embodiments, the license holder device 304 stores an asymmetric private key while the network/cloud infrastructure 302 has a corresponding public key, where the CVC is a nonce (or similar) signed by the license holder device 304 using the private key. The nonce (or similar) may be generated by the license holder device 304, the network/cloud infrastructure 302, and/or the relying party device 306.

Figure 13:
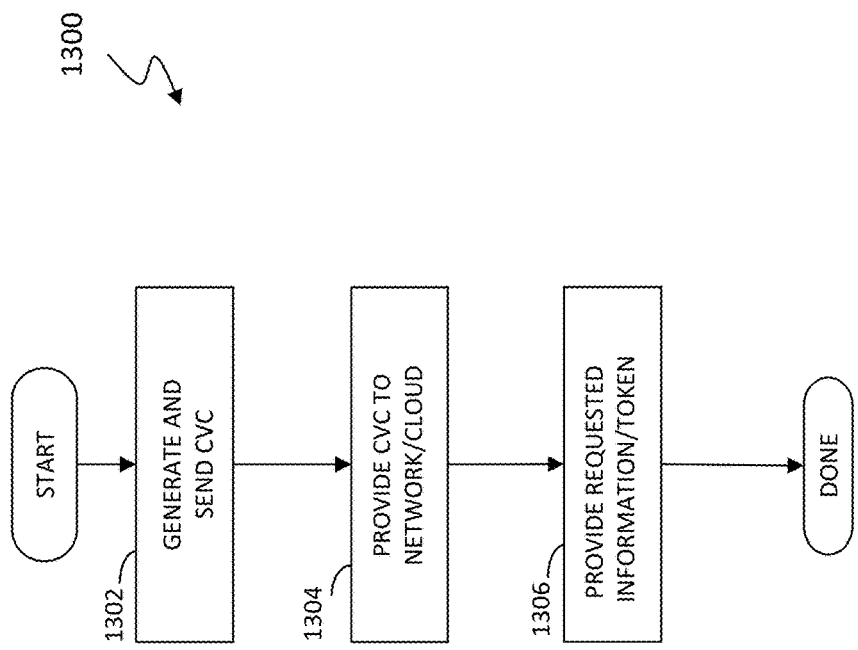
FIG. 13 is a flow diagram illustrating processing performed in connection with a relying party device obtaining online information according to an embodiment of the system described herein.

Referring to FIG. 13, a flow diagram 1300 illustrates in more detail the relying party device 306 obtaining data from an online source, such as the network/cloud infrastructure 302. Processing begins at a first step 1302 where the license holder device 304 generates a CVC and provides the CVC to the relying party device 306. As discussed elsewhere herein, in some embodiments, the CVC may include a URL of a particular website in the network/cloud infrastructure 302. Following the step 1302 is a step 1304 where the relying party device 306 provides to the network/cloud infrastructure 302 the CVC as well as possibly other identification/verification information (e.g., a digitally signed identifier for one or both of the license holder device 304 and the relying party device 306). Following the step 1304 is a step 1306 where the network/cloud infrastructure 302 provides the requested information to the relying party device 306. In some embodiments, the network/cloud infrastructure 302 may provide a token to the relying party device 306 where the token may be used to subsequently retrieve data from the network/cloud infrastructure 302 or possibly even a different source. Following the step 1306, processing is complete.

As discussed elsewhere herein, it is desirable that the license holder not release information to an unauthorized relying party or to a malicious actor fraudulently posing as a legitimate relying party. This can be accomplished by using a verifying device secret (VDS) with the relying party device. However, as discussed elsewhere herein, there may be challenges with storing a VDS in a commercially-available smartphone that is programmed to be used as a relying party device.

Figure 14:
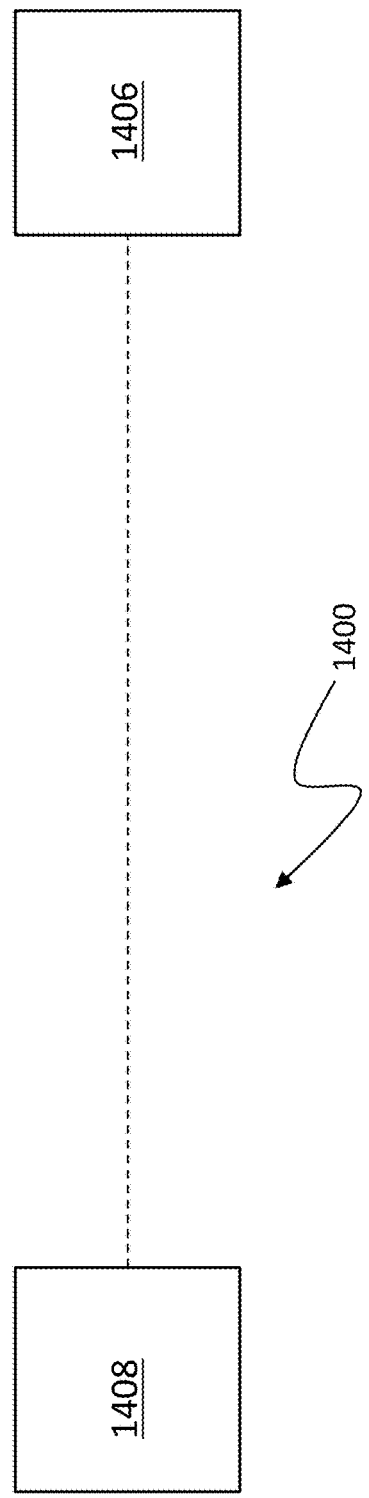
FIG. 14 is a schematic illustration showing a relying party device and a secure access module according to an embodiment of the system described herein

Referring to FIG. 14, a diagram 1400 shows a relying party device 1406 in communication with a portable Secure Access Module (SAM) 1408. The relying party device 1406 is like the relying party device 306, described elsewhere herein, and the relying party devices 306, 1406 provide similar functionality. The relying party device 1406 may be an off-the-shelf smartphone (such as an Android or IOS device) that has been programmed to provide the functionality described herein. The SAM 1408 may contain a secure element, such as a conventional tamper-proof chip, that stores the VDS, but that may only be accessed in a secure manner. The VDS cannot be accessed/read by physically breaching the tamper-proof chip and cannot be otherwise accessed/read without using appropriate protocol and credentials. Communication between the SAM 1408 and the relying party device 1406 may use RFID technology and/or Bluetooth Smart (BLE) communication. Note that BLE communication may rely on data secrets that are built in to the relying part device 1406 that are used when the SAM 1408 is initially paired with the relying party device 1406. The SAM 1408 may be implemented using a battery-powered fob, a smart card, or similar technology. In some instances, an entire verifying application, as well as the VDS, may be stored on the secure element of the SAM 1408.

The VDS in the SAM 1408 may be used to prove identity of the relying party. For example, the VDS could be a private key of a public/private key pair where the public key for the particular relying party is provided in a PKI digital certificate (which may also be stored in the SAM 1408). In such a case, an entity communicating with the relying party device 1406 could evaluate digitally signed data from the relying party device 1406 to confirm authenticity of the relying party. The data could be, for example, a cryptographic nonce provided by the license holder device (or the network/cloud infrastructure 302, described above) to the relying party. In addition, the VDS in the SAM 1408 may be is used to in connection with establishing a mutual authentication protocol, such as Seos, Seos AKE, OPACITY, PACE, EVM, etc., for communication between the relying party and either or both a network/cloud infrastructure and a license holder device. In some embodiments, all (or nearly all) of the communication-related cryptographic operations may be provided in the SAM 1408 for the benefit of the relying party device 1406. In other embodiments, the SAM 1408 provides some operations/values to the relying party device 1406 which performs some of the cryptographic operations for communication therewith. This is described in more detail elsewhere herein.

Figures 15, 16:
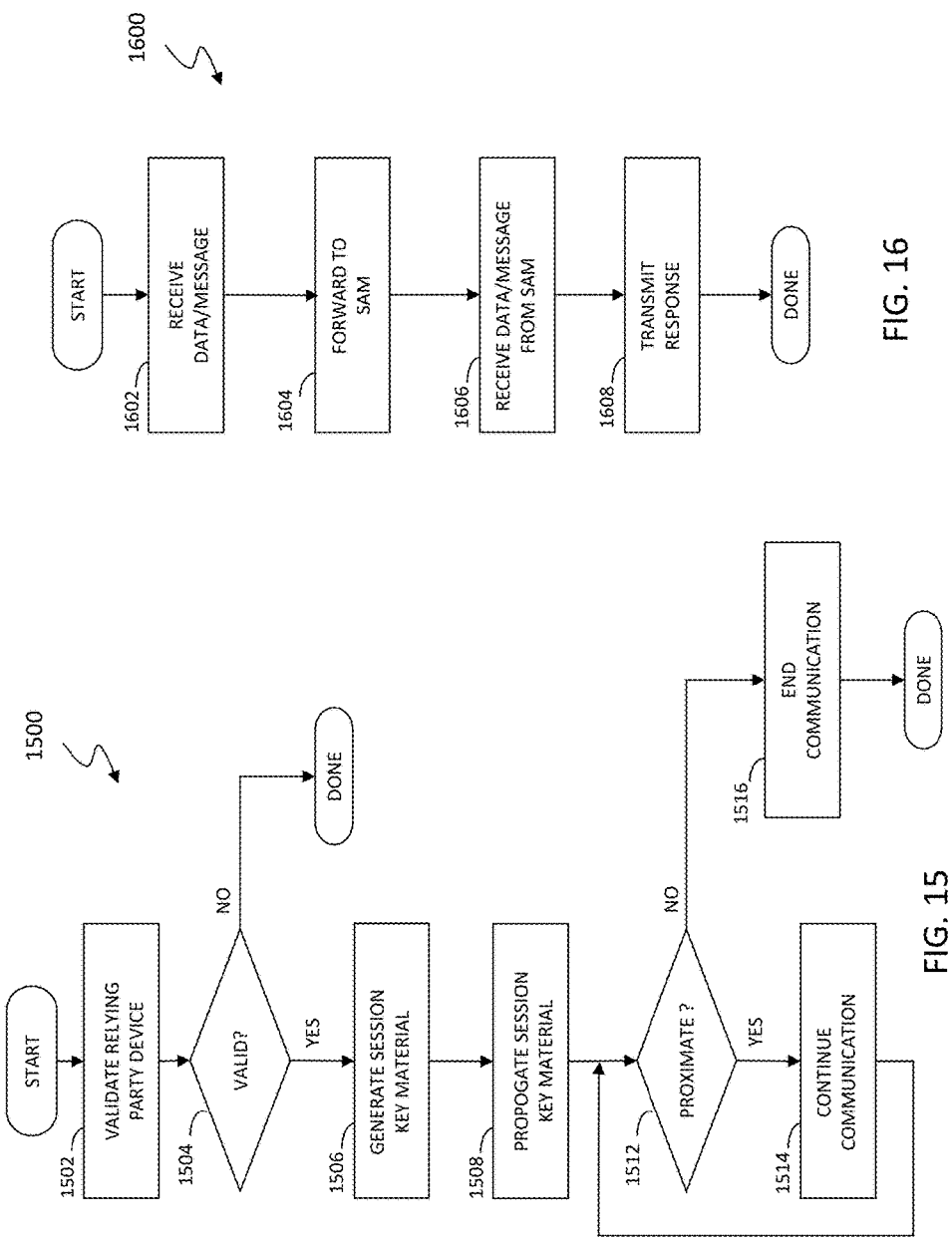
FIG. 15 is a flow diagram illustrating processing performed in connection with communication using a relying party device and a secure access module according to an embodiment of the system described herein.
FIG. 16 is a flow diagram illustrating processing performed in connection with verification provided by a relying party device according to an embodiment of the system described herein.

Referring to FIG. 15, a flow diagram 1500 illustrates steps performed in connection with establishing and conducting communication between the relying party device 1406 and either a license holder device or a network/cloud infrastructure. Processing begins at a first step 1502 where an entity (license holder device or network/cloud infrastructure) that communicates with the relying party device 1406 verifies the relying party device using the VDS stored in the SAM 1408. Any appropriate mechanism may be used to verify the relying party device 1406 with the VDS, such as the VDS being a private key of a public key/private key pair, discussed elsewhere herein.

Following the step 1502 is a test step 1504 where the entity (license holder device or network/cloud infrastructure) that communicates with the relying party device 1406 determines if a response from the relying party device is valid (i.e., a proper digital signature, a proper decryption of a cryptographic nonce, etc.). If not, then processing is complete. Otherwise, control transfers from the test step 1504 to a step 1506 where the SAM 1408 generates session key material that will be used for communication to and from the relying party device 1406. In some embodiments, the session key material is generated based on the VDS, although it is possible for the session key material to be independent of the VDS. Following the step 1506 is a step 1508 where the session key material is transmitted to the relying party device 1406 from the SAM 1408 and from the relying party device 1406 to the entity (license holder device or network/cloud infrastructure) that communicates with the relying party device 1406. Note that the session key material may be appropriately encrypted in connection with being transmitted to prevent interception by a malicious entity. In some instances, the session key material may consist of a single key while in other cases the session key material may be multiple keys.

Following the step 1508 is a test step 1512 where it is determined if the SAM 1408 is still proximate to the relying party device 1406 (e.g., still in BLE range). The test at the step 1512 may be based on whether or not there is communication between the relying party device 1406 and the SAM 1408 where proximity is assumed if and only if there is communication therebetween. In an embodiment herein, relying party device 1406 communicates with the license holder device or network/cloud infrastructure only if the SAM 1408 is proximate to the relying party device 1406. This feature may provide enhanced security. For example, a police officer may maintain the SAM 1408 in his pocket or in a locked glovebox of his patrol car so that, if the relying party device 1406 is stolen, the relying party device 1406 will not operate because the relying party device 1406 is not proximate to the SAM 1408. Note also that the processing at the step 1502, discussed above, is not performed if the SAM 1408 is not proximate to the relying party device 1406.

If it is determined at the test step 1512 that the SAM 1408 is proximate to the relying party device 1406, then processing proceeds to a step 1514 to continue communication between the relying party device 1406 and the entity (license holder device or network/cloud infrastructure) that communicates with the relying party device 1406. In an embodiment herein, some or all communication to and from the relying party device 1406 is encrypted using the session key, discussed above. Following the step 1514, control transfers back to the step 1512 to continue to test for proximity. If it is determined at the test step 1512 that the SAM 1408 is not proximate to the relying party device 1406, then processing proceeds to a step 1516 where communication is halted. Following the step 1516, processing is complete.

Referring to FIG. 16, a flow diagram 1600 illustrates steps performed by the relying party device 1406 in connection with receiving and responding to a request for verification by an entity (license holder device or network/cloud infrastructure) that communicates with the relying party device 1406. Processing begins at a first step 1602 where the relying party device 1406 receives a request/message to initiate verification. The specific data received at the step 1602 depends upon the particular mechanism being used for verification, discussed elsewhere herein. Following the step 1602 is a step 1604 where data is forwarded to the SAM 1408. As in the step 1602, the specific data that is forwarded at the step 1604 depends upon the particular mechanism being used for verification. Following the step 1604 is a step 1606 where the relying party device 1406 receives a response from the SAM 1408. Following the step 1606 is a step 1608 where the relying party device 1406 forwards the response from the SAM 1408 to the entity (license holder device or network/cloud infrastructure) that communicates with the relying party device 1406. Following the step 1608, processing is complete.

Note that, in some instances it may be possible to provide a similar verification mechanism for the license holder device and/or the network/cloud infrastructure. In some embodiments, it is possible to have all encryption operations being performed by the SAM 1408 so that, for example, a session key is never provided to the relying party device 1406. However, in other embodiments, the relying party device 1406 uses the session key directly, but the session key is discarded and/or has a limited lifespan (i.e., expires quickly) to mitigate security issues that may arise from having the relying party device 1406 store the session key. Having the relying party device 1406 use the session key directly reduces interaction with the SAM 1408 and could provide a performance increase.

In some cases, the SAM 1408 may be bound to the relying party device 1406 based on a public key/certificate stored in the SAM 1408. The relying party device 1406 may, on connecting to the SAM 1408, receive a proof the SAM 1408 is genuine and the relying party device 1406 and the SAM 1408 can use the public key to establish a secure communication channel therebetween to protect transfer of the session key and other communications. In some embodiments, the SAM 1408 could send to the relying party device 1406, at the start of each day, a short-lived token/derived key/keypair/CVC that is then used by the relying party device 1406 for complete mutual authentication. Since the token/derived key/keypair/CVC is short-lived, the fact that the token/derived key/keypair/CVC reside on the relying party device 1406 may not be a significant security risk. In some embodiments, the SAM 1408 contains a keyset/certificate that identifies a particular person as the relying party; this would allow, for example, updates of the credential or verification transactions to be digitally signed and the transaction log uploaded from the verification application to the cloud or an administration backend.

The system described herein may be used for automatically populating of a form, automatically checking out, validating a physical credential, and/or to board a plane. In the case of boarding a plane, a smartphone of a user may provide both identification and a boarding pass. In some cases, a tap of the smartphone may be used to get past TSA authentication while going from an unsecured portion of the airport to a secured portion of the airport dedicated to flying passengers. It may also be possible to include TSA pre-approval with the same tap where TSA pre-approval might be a 'status' shown on the display of the smartphone. In addition, the system described herein may be used to validate a biometric at a gate to provide a Biometric Exit functionality so that a user transfers their identity to an airline by providing a biometric while boarding the plane so that the airline validates that the user actually boards the plane and does not leave the airport. It is possible to store on a device of a user a log indicating that a sequence of checks within an airport were performed. The smartphone allows generation of a key pair that is protected with a biometric. In an embodiment, the following sequence occurs:

a user walks up to the gate
an application on the smartphone is in listen/input mode
the user presses a biometric touch/id on the smartphone
the smartphone releases a (temporary) key/pair that was optionally generated within a protected component on the smartphone. Thus, the key/pair is already known to a validating authority and it is not necessary to distribute biometric data of the user to the validating authority.

The biometric information may be facial, fingerprint, iris scans, etc. Self-reporting via mobile technology broadening allows the user to use the mobile processing power of the smartphone, relieving the load on the government systems.

The system described herein may be used in an amusement park, such as Disneyworld. A "Fast Pass" system allows a user to get to the front of the line of a ride using a wrist band that the is provided by the park. The wrist bands need to be authorized. The system described herein allows authorization to be delivered to wrist band using smartphones of the users, thus allowing users to purchase Fast Pass tickets on the Web without having to wait in line. SEOS could be the authentication technology that is used.

As another example, Austin city limits allows users to provide cashless payments via a smartphone, but it is still necessary to present a separate physical ID card. The system described herein allows a smartphone to be used to provide cashless payment authorization and proof of age to buy an adult beverage at the same time. A sales associate could receive a 'code' instead of an identity that shows both that the user paid and was over 21. Thus the user is registered with certain permissions (>21 being just one example). The system described herein could be extended to cruise ship amenity access.

It is also possible to provide a remote identity application with a one time password, digital certificates for documents, an ability to fill out forms remotely, and/or self-identify a user via a smartphone. It is also possible to use the system described herein in connection with online mortgage applications. It is also possible to link a mobile id of a user with a trusted tag proof of presence. Real estate lock boxes could be replaced with a "key" provided by the system described herein. It is also possible to use the system described herein in connection with an AutoID in a healthcare environment. A user would identify themselves ahead of time (e.g., when making an appointment) by sharing identity information provided by the system described herein. Thus, when the user arrives for a medical appointment, the medical personnel know of the arrival arrived because the smartphone broadcasts an appropriate message that the user has arrived. Thus, by carrying the smartphone, the user does not need to check in with a receptionist. This system described herein automatically identifies the user, and allows location of appropriate medical records.

The system described herein may be used in connection with an automobile recording an identity of a person driving the automobile. If there is an accident, insurance information tied to the identity may be automatically saved (for example when the air bags are deployed) to a log so that the automobile rental company (or automobile sharing company) can determine who was driving the automobile at the moment of the accident. The insurance that is tied to the identity may be digitally signed by the insurance company, and the insurance/identity combination may be digitally signed to confirm a relationship between the insurance company and the identity.

Note that any sort of license application could be the same application (i.e., reused). One license could be a 'breeder' for other licenses (fishing, dog, etc.). The breeder license has all of the personal data of the license holder (such as address) and thus the breeder license can be used to pre-populate other licenses. It is possible to provide an option for the user to need to explicitly authorize the release of information in the breeder license to the other license applications.

The system described herein may be used to prevent a gun from firing unless is it properly linked to a mobile id. Similarly, it is possible to integrate gaming equipment to prevent participation by underage users. Different version of credentials may be provided to different classes of users, for example, individuals under a certain age (e.g., 18). Individuals with a Learner's Permit driver's license learning to drive may only drive if another licensed driver is present. The smartphone may capture the fact that a person is next to the driver and capture the time frame that the person is present. The information may be captured for reporting to the state. If an automobile is tagged, it may be possible to track the car being driven. The system described herein may be used to prevent texting while driving. If a user is under 18, the system may turn off texting capabilities. In some instances, allowing texting to be disabled be voluntary, but may reduce insurance costs. The system described herein may be used to log the type of road (highway/backroads, rural-vs-city road, etc.) detected via google maps and based on sensed mobile location. The result may be tied to license driving history and/or may be used to alter insurance rates.

The system described herein may be used for USCIS—integrating mobile into greencard. Self-reporting may be helpful, along with a biometric. The Biometric Exit on a plane mechanism, described above, may be applied to someone passing through a country border. In some embodiments, biometrics are all that is needed to get on to plane. The system locates a ticket of a user. As the user boards a flight, the system may automatically notify, for example, a rental car service that the user boarded the flight, and that the car should be reserved. In some cases, the system may limit information transmitted during authentication. A user may somehow validate information on a mobile id license. A user may release information into a form. The system may automatically populate information into the forms. A user may supplement information stored with a mobile id and prepopulate forms with the information. For example, an employer could supplemental information that is not required (stored) in a standard driver's license. Having the information from the driver's license could help pre-populate many forms. The information could be protected by driver's license security features. A mechanism could be provided to validate the data.

The system described herein may be used in connection with renting a car. When a user rents a car or test drives a new car, the user may tap their smartphone, which then automatically provides a copy of the license and a copy of the insurance that is electronically signed by the insurance company to the car dealer or rental company. The rental company may use a public key of the insurance company to decode the insurance and thus validate the insurance. The validation may confirm that the insurance was current online at the time of the check. In some cases, when the insurance is renewed, a user automatically receives updated insurance information downloaded to the license holder device and/or a network/cloud infrastructure. The system described herein may provide a tunnel to all other mobile licenses.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only.

What is claimed is:

1. A method of examining virtualized credentials of a holder, comprising:
   verifying authenticity of a device of a relying party using a verifying device secret (VDS) that is provided in a portable secure access module device that is separate from and communicates with the relying party device;
   authorizing a subset of credential data to be sent to the device of the relying party in response to the device of the relying party being authentic, wherein the subset of credential data depends on at least one of: a role of the relying party, selection by the holder, and contextual data of the relying party; and
   communicating with the device of the relying party to display at least some of the subset of credential data on a screen of the device of the relying party.

2. The method, according to claim 1, wherein the contextual data is at least one of: a privacy level setting, distance between the relying party and the holder, and geolocation of the relying party.

3. The method, according to claim 1, wherein the role of the relying party is provided by the relying party.

4. The method, according to claim 1, further comprising:
   the relying party presenting the subset of credential data to a verification service.

5. The method, according to claim 4, wherein the subset of credential data sent to the verification service includes a cryptogram generated as a function of cryptographic information associated with a device of the holder.

6. The method, according to claim 5, wherein the cryptographic information includes a cryptographic key stored on the device of the holder.

7. The method, according to claim 5, wherein the cryptogram includes a variable component corresponding to at least one of: time, a counter or a randomly generated nonce.

8. The method, according to claim 4, wherein the relying party communicates with an intermediary service that directs the relying party to a particular one of a number of possible verification services.

9. The method, according to claim 1, wherein the secure access module device is one of: a fob or a smart card.

10. The method, according to claim 1, further comprising:
    ending communication by the device of the relying party in response to the secure access module device not being proximate to the device of the relying party.

11. A non-transitory computer-readable medium containing software that examines virtualized credentials of a holder, the software comprising:
    executable code that verifies authenticity of a device of a relying party using a verifying device secret (VDS) that is provided in a portable secure access module device that is separate from and communicates with the relying party device;
    executable code that authorizes a subset of credential data to be sent to the device of the relying party in response to the device of the relying party being authentic, wherein the subset of credential data depends on at least one of: a role of the relying party, selection by the holder, and contextual data of the relying party; and executable code that communicates with the device of the relying party to display at least some of the subset of credential data on a screen of the device of the relying party.

12. The non-transitory computer-readable medium, according to claim 11, wherein the contextual data is at least one of: a privacy level setting, distance between the relying party and the holder, and geolocation of the relying party.

13. The non-transitory computer-readable medium, according to claim 11, wherein the role of the relying party is provided by the relying party.

14. The non-transitory computer-readable medium, according to claim 11, wherein the relying party presents the subset of credential data to a verification service.

15. The non-transitory computer-readable medium, according to claim 14, wherein the subset of credential data sent to the verification service includes a cryptogram generated as a function of cryptographic information associated with a device of the holder.

16. The non-transitory computer-readable medium, according to claim 15, wherein the cryptographic information includes a cryptographic key stored on the device of the holder.

17. The non-transitory computer-readable medium, according to claim 15, wherein the cryptogram includes a variable component corresponding to at least one of: time, a counter or a randomly generated nonce.

18. The non-transitory computer-readable medium, according to claim 14, wherein the relying party communicates with an intermediary service that directs the relying party to a particular one of a number of possible verification services.

19. The non-transitory computer-readable medium, according to claim 11, wherein the secure access module device is one of: a fob or a smart card.

20. The non-transitory computer-readable medium, according to claim 11, further comprising:

executable code that ends communication by the device of the relying party in response to the secure access module device not being proximate to the device of the relying party.

* * * * *